US008938238B2

(12) United States Patent
Yavuz et al.

(10) Patent No.: US 8,938,238 B2
(45) Date of Patent: *Jan. 20, 2015

(54) RESTRICTING ACCESS POINT TRANSMISSIONS

(75) Inventors: Mehmet Yavuz, San Diego, CA (US); Leonard Henry Grokop, San Diego, CA (US); Chirag Sureshbhai Patel, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 12/917,627

(22) Filed: Nov. 2, 2010

(65) Prior Publication Data

US 2011/0275361 A1    Nov. 10, 2011

Related U.S. Application Data

(60) Provisional application No. 61/259,010, filed on Nov. 6, 2009.

(51) Int. Cl.
*H04W 36/00* (2009.01)
*H04W 52/14* (2009.01)
(Continued)

(52) U.S. Cl.
CPC .......... *H04W 52/244* (2013.01); *H04W 84/045* (2013.01); *H04W 52/40* (2013.01); *H04W 52/143* (2013.01); *H04W 52/245* (2013.01); *H04W 52/246* (2013.01); *Y02B 60/50* (2013.01)
USPC ............. 455/436; 455/502; 455/68; 455/522; 455/122.1; 455/75; 455/555; 455/456; 455/161.3; 455/411

(58) Field of Classification Search
CPC ............ H04W 52/143; H04W 52/244; H04W 52/245; H04W 52/246; H04W 52/40; H04W 84/045

USPC ............. 455/502, 68, 522, 122.1, 552.1, 501, 455/517, 436, 75, 555, 456, 456.1, 161.3, 455/410, 411; 370/329, 229, 330, 331, 311, 370/338, 336, 356

See application file for complete search history.

(56) References Cited

U.S. PATENT DOCUMENTS 7,890,130 B2 * 2/2011 Sung et al. .................... 455/522
7,907,571 B2   3/2011 Raghothaman et al.
(Continued)

FOREIGN PATENT DOCUMENTS

CN    101370306 A    2/2009
CN    101400087 A    4/2009
(Continued)

OTHER PUBLICATIONS

International Search Report and Written Opinion—PCT/US2010/055738, International Search Authority—European Patent Office—Feb. 14, 2011.

(Continued)

*Primary Examiner* — Joseph Arevalo

(57) ABSTRACT

Transmissions by a first access point (e.g., a femto cell) are restricted upon detecting an access terminal in the vicinity of the first access point in the event the access terminal is communicating with a second access point (e.g., a macro cell). Upon detection of such an access terminal, the access terminal restricts transmission (e.g., beacon transmission) on a downlink carrier frequency on which the access terminal is actively receiving information from the second access point. This restriction of transmission by the access point may involve, for example, temporarily reducing transmit power, reducing the periodicity of transmission, or ceasing transmission.

53 Claims, 18 Drawing Sheets

(51) Int. Cl.
*H04W 52/24* (2009.01)
*H04W 84/04* (2009.01)
*H04W 52/40* (2009.01)

(56) References Cited

U.S. PATENT DOCUMENTS

| | | | |
|---|---|---|---|
| 7,907,945 B2* | 3/2011 | Deprun | 455/432.1 |
| 2004/0218562 A1* | 11/2004 | Orava et al. | 370/329 |
| 2006/0280200 A1 | 12/2006 | Lane et al. | |
| 2006/0281476 A1* | 12/2006 | Lane et al. | 455/502 |
| 2007/0042799 A1 | 2/2007 | Jubin et al. | |
| 2007/0066329 A1* | 3/2007 | Laroia et al. | 455/502 |
| 2007/0149138 A1* | 6/2007 | Das | 455/68 |
| 2007/0149238 A1* | 6/2007 | Das et al. | 455/522 |
| 2007/0159969 A1* | 7/2007 | Das et al. | 370/229 |
| 2008/0057912 A1* | 3/2008 | Deprun | 455/413 |
| 2008/0057934 A1* | 3/2008 | Sung et al. | 455/422.1 |
| 2009/0042593 A1 | 2/2009 | Yavuz et al. | |
| 2009/0111499 A1* | 4/2009 | Bosch et al. | 455/522 |
| 2009/0124284 A1* | 5/2009 | Scherzer et al. | 455/552.1 |
| 2009/0135754 A1 | 5/2009 | Yavuz et al. | |
| 2010/0035615 A1* | 2/2010 | Kitazoe et al. | 455/436 |
| 2010/0195627 A1 | 8/2010 | Sundarraman et al. | |
| 2011/0003559 A1 | 1/2011 | Morita et al. | |
| 2011/0064043 A1* | 3/2011 | Balachandran et al. | 370/330 |

FOREIGN PATENT DOCUMENTS

| | | |
|---|---|---|
| CN | 101553023 A | 10/2009 |
| EP | 2136593 A2 | 12/2009 |
| WO | WO-2009072355 A1 | 6/2009 |
| WO | 2009122778 A1 | 10/2009 |

OTHER PUBLICATIONS

Pico Chip Designs. et al., "HeNB to macro eNB cochannel interference simulations—downlink", 9.7, FDD HeNB, 3GPP TSG-RAN WG4 #52, R4-092713, Shenzhen, CN, Aug. 24-28, 2009, pp. 5.
Taiwan Search Report—TW099138156—TIPO—Dec. 6, 2013.

* cited by examiner

RESTRICTING ACCESS POINT TRANSMISSIONS

CLAIM OF PRIORITY

This application claims the benefit of and priority to commonly owned U.S. Provisional Patent Application No. 61/259,010, filed Nov. 6, 2009, the disclosure of which is hereby incorporated by reference herein.

BACKGROUND

1. Field

This application relates generally to wireless communication and more specifically, but not exclusively, to controlling access point transmissions.

2. Introduction

A wireless communication network may be deployed over a geographical area to provide various types of services (e.g., voice, data, multimedia services, etc.) to users within that geographical area. In a typical implementation, macro access points (e.g., each of which provides service via one or more cells) are distributed throughout a macro network to provide wireless connectivity for access terminals (e.g., cell phones) that are operating within the geographical area served by the macro network.

As the demand for high-rate and multimedia data services rapidly grows, there lies a challenge to implement efficient and robust communication systems with enhanced performance. To supplement conventional network access points (e.g., to provide extended network coverage), small-coverage access points (e.g., low power access points) may be deployed to provide more robust indoor wireless coverage or other coverage to access terminals inside homes, enterprise locations (e.g., offices), or other locations. Such small-coverage access points may be referred to as, for example, femto cells, femto access points, home NodeBs, home eNodeBs, or access point base stations. Typically, such small-coverage access points are connected to the Internet and the mobile operator's network via a DSL router or a cable modem. For convenience, small-coverage access points may be referred to as femto cells or femto access points in the discussion that follows.

When a femto cell is deployed on a carrier frequency that is different from the carrier frequencies used by neighboring macro cells, the femto cell may radiate beacons on the macro cell carrier frequencies. In this way, the femto cell may attract an access terminal that is in the vicinity of the femto cell to the femto cell coverage (i.e., cause the access terminal to move off of the macro cell coverage). Thus, through the use of this beacon scheme, a user coming home (e.g., approaching a home femto cell) from outside the coverage of the femto cell will be able to readily discover the femto cell and obtain service from the femto cell. Though such beacons are useful in terms of femto cell discovery, they may create interference on the macro network since the beacons are transmitted on the same carrier frequency that is used by neighboring macro cells. This interference may affect the voice call quality of active macro cell users (i.e., users actively receiving service from one or more macro cells on a macro cell frequency) and may also lead to call drops if the macro cell user happens to be very close to the femto cell. Therefore, there is a need to protect active macro cell users from interference from femto cells.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to restricting transmissions by an access point. For example, upon detecting an access terminal at a first access point (e.g., a femto cell), the access point may identify a downlink carrier frequency on which the access terminal is actively receiving information from a second access point (e.g., a macro cell). Based on the detection of this access terminal, the first access point may restrict transmission on the identified downlink carrier frequency.

The restriction of transmission by the access point may be accomplished in various ways. In some cases, the access point temporarily reduces transmit power. In some cases, the access point temporarily reduces the periodicity of its transmission. In some cases, the access point temporarily ceases transmission. Transmit power may be reduced or ceased for transmission on a beacon channel and/or on a femto cell operating downlink channel.

The disclosure relates in some aspects to protecting active macro cell users from beacon interference from femto cells. For example, upon detecting the presence of a nearby active macro cell user, a femto cell temporarily applies beacon throttling on a macro cell downlink carrier frequency to mitigate any potential interference that may otherwise be experienced by the macro cell user due to beacon transmissions by the femto cell. Here, beacon throttling may involve, for example, reducing beacon transmit power, reducing beacon transmission periodicity, reducing beacon transmit power and beacon transmission periodicity, or completely shutting down beacon transmissions. Advantageously, this protection may be provided in real-time to ensure that macro cell user call quality is not severely affected.

BRIEF DESCRIPTION OF THE DRAWINGS

These and other sample aspects of the disclosure will be described in the detailed description and the appended claims that follow, and in the accompanying drawings, wherein:

Figure 1:
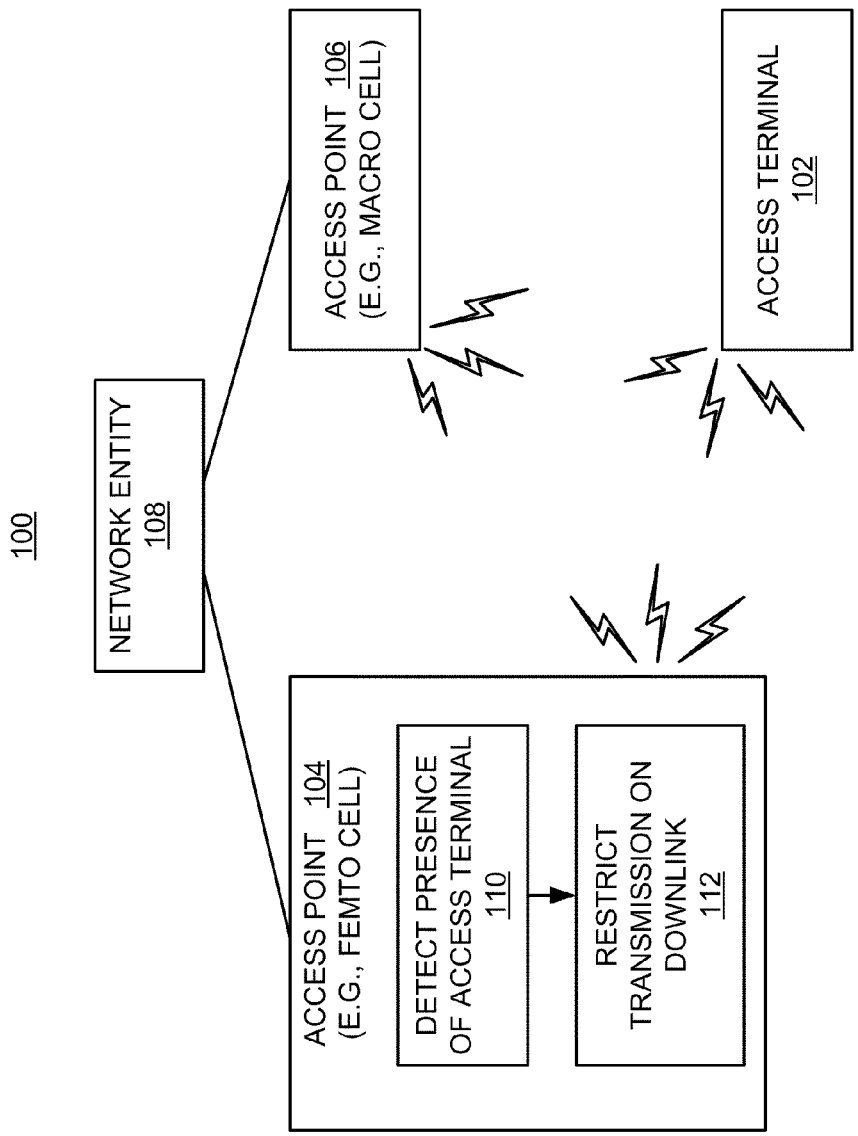
FIG. 1 is a simplified block diagram of several sample aspects of a communication system where an access point restricts transmission upon detecting an access terminal.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, and so on, while access terminals may be referred to or implemented as user equipment (UEs), mobiles, and so on.

Access points in the system 100 provide access to one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, or some access point in the system 100 (not shown). Each of these access points may communicate with one or more network entities (represented, for convenience, by the network entity 108) to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals. Also, two of more of these network entities may be co-located and/or two or more of these network entities may be distributed throughout a network.

The access point 104 includes functionality (as represented by the block 110) to detect the presence of an access terminal in the vicinity of the access point 104 so that the access point 104 may determine whether its transmissions potentially interfere with such an access terminal. For example, the access point 104 (e.g., a femto cell) may include the capability to detect the presence of a nearby access terminal 102 that is currently in active communication with the access point 106 (e.g., a macro cell).

To reduce interference at the access terminal 102 that may otherwise be caused by transmissions by the access terminal 102, the access point 104 includes functionality (as represented by the block 112) to restrict transmission by the access point 104 upon detection of the access terminal 102. For example, the access point 104 may restrict transmission on its forward link, or restrict the transmission of beacons or other signals on the downlink carrier frequency that the access point 106 uses to communicate with the access terminal 102. Also, in some cases, the access point 104 may restrict transmission on adjacent carrier frequencies to mitigate any potential interference on those carrier frequencies as well.

As a specific example, the access point 104 may comprise a femto cell that operates on one carrier frequency and transmits beacons on macro carrier frequencies to enable any home access terminals (i.e., access terminals that are authorized to access the access point 104) in the vicinity to discover the access point 104. In this case, the access point 104 is configured to detect any nearby macro access terminals (i.e., access terminals operating on a macro network). Upon detecting a nearby macro access terminal, the access point 104 restricts its beacon transmissions (and/or other types of transmissions) on the macro downlink carrier frequency used by the macro network to communicate with the macro access terminal(s). Consequently, voice quality at the macro access terminal(s) may not be significantly degraded due to interference from the femto cell, and the macro access terminal(s)

may not experience call drops that could otherwise result from interference from the femto cell.

The access point 104 may detect the presence of an access terminal in various ways. Several examples for the case where the access point 104 comprises a femto cell that restricts its beacon transmissions follow.

In some implementations, the femto cell detects the presence of a nearby macro cell user by measuring received signal strength on the macro cell uplink carrier frequency that is (or frequencies that are) paired with a macro cell downlink carrier frequency (or frequencies). This measurement may be referred to as a received signal strength indication (RSSI). For example, the measurement of an uplink RSSI value that exceeds a certain expected value may serve as an indication of the presence of an active macro cell user that is receiving on the corresponding downlink frequency. The femto cell may thus restrict transmission on the downlink carrier frequency or set of downlink carrier frequencies on which the macro cell user receives information from the macro network.

In some implementations, the presence of a nearby active macro cell user may be known apriori to the access point 104. For example, in a case of active handover of an access terminal from a femto cell to a macro cell (commonly referred to as active hand-out) of a restricted user or guest user, the femto cell will know that this access terminal is in the vicinity of the femto cell and is now being served by the macro cell. The femto cell may therefore restrict transmission (e.g., apply beacon throttling) on the downlink carrier frequency or the set of downlink carrier frequencies on which the macro cell user receives information from the macro network.

The access point 104 may restrict its transmission in various ways. In some implementations, the access point 104 temporarily reduces its transmit power. For example, the access point 104 may temporarily reduce the maximum transmit power limit that it uses for transmitting beacons. In some implementations, the access point 104 temporarily reduces the periodicity of its transmission. For example, in a case where the access point 104 periodically transmits a beacon on a given carrier frequency (e.g., when time division multiplexing beacon transmissions on different carrier frequencies), the access point 104 may temporarily reduce the period of time that a beacon is transmitted on the carrier frequency. In some implementations, the access point 104 temporarily ceases transmission. For example, the access point 104 may temporarily cease transmitting beacons on any macro carrier frequencies that are being used to send information to a detected access terminal.

The access point 104 may employ various techniques for restricting transmission on a temporary basis. In some implementations, the access point 104 restricts transmission for a defined period of time. For example, the access point 104 may start a timer upon restricting transmission, and terminate the restriction of transmission once the timer expires. In some implementations the access point 104 restricts transmission until a terminating event occurs. For example, in cases where detection of an access terminal is based on a measured received signal strength exceeding a threshold, the access point 104 may terminate the restriction of transmission when measured received signal strength falls below a certain configurable threshold. In any of these cases, upon terminating the restriction of transmission, the access point 104 may resume transmitting at the transmit power level and/or periodicity that was used prior to the restriction of transmission.

The access point 104 may restrict transmission on one or more carrier frequencies. For example, the access point 104 may restrict transmission on a downlink carrier frequency corresponding to an uplink carrier frequency where the received signal strength measured on the uplink carrier frequency is greater than or equal to a threshold (e.g., expected) value. In addition, the access point 104 may restrict transmission on one or more adjacent downlink frequencies, if applicable, to protect an active macro user from adjacent channel beacon interference.

When a femto cell is operating on a different carrier frequency from its neighboring macro cells, the femto cell may need to detect the presence of an access terminal (e.g., by measuring received signal strength) on an uplink carrier frequency that is different from the femto cell's normal operating uplink carrier frequency. Various techniques may be employed here. In some implementations, the femto cell periodically tunes its receive chain to other uplink carrier frequencies while ensuring minimal service interruption on the femto cell's normal uplink carrier frequency. In implementations where at least one receive diversity chain (e.g., a receive chain other than the receive chain the femto cell uses for serving its access terminals) is available in the femto cell, then one of the receive chains may used on a periodic basis to detect the presence of an access terminal (e.g., by measuring uplink received signal strength) on the macro cell frequencies while keeping the other receive chain reserved for normal uplink carrier frequency operations. In some implementations, the femto cell is equipped with an extra receive chain that may be dedicated for detecting the presence of access terminals (e.g., measuring uplink received signal strength) on different frequencies.

Sample operations that may be performed in conjunction with detecting an access terminal and restricting transmission will now be described in more detail in conjunction with the flowcharts of FIGS. 2-12. For convenience, the operations of FIGS. 2-12 (or any other operations discussed or taught herein) may be described as being performed by specific components (e.g., the components of FIG. 1 or FIG. 13). It should be appreciated, however, that these operations may be performed by other types of components and may be performed using a different number of components. It also should be appreciated that one or more of the operations described herein may not be employed in a given implementation.

Figure 2:
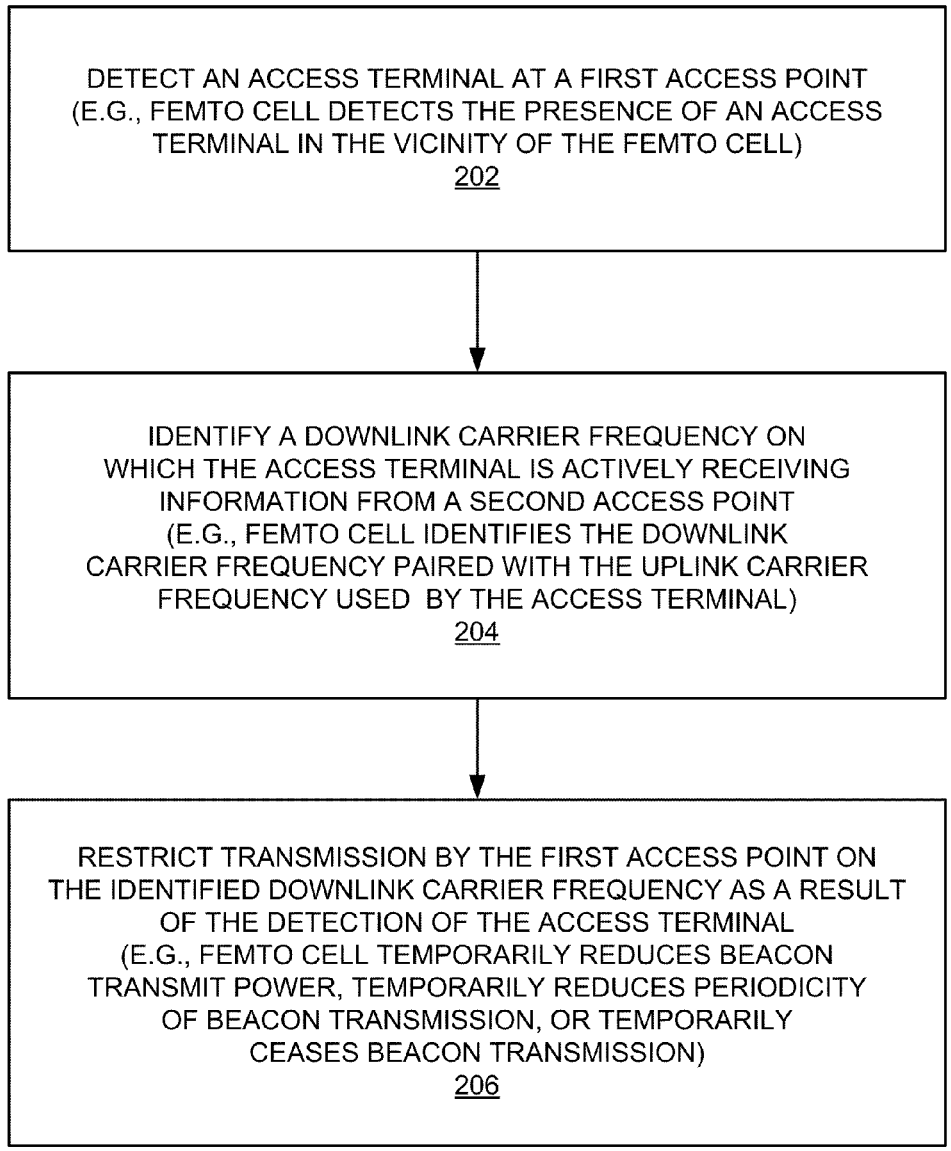
FIG. 2 is a flowchart of several sample aspects of operations that may be performed in conjunction with restricting transmission at an access point upon detection of an access terminal.

FIG. 2 illustrates sample operations that may be performed to restrict transmission by an access point in accordance with the teachings herein. For purposes of illustration, these operations are described in the context of a first access point (e.g., comprising a femto cell) that detects the presence of an access terminal that is in active communication with a second access point (e.g., comprising a macro cell). Here, the term active communication (or actively receiving, etc.) means that the access terminal is in an active mode (as opposed to idle mode) at the second access point and will therefore be receiving information from the second access point at some point in time (e.g., occasionally, periodically, continuously, etc.).

As represented by block 202 of FIG. 2, at some point in time the first access point detects an access terminal at the first access point. In some aspects, a determination that an access terminal is at the first access point comprises determining that the access terminal is sufficiently close to (near) the first access point such that the access terminal is subject to interference from transmissions (e.g., beacon transmissions) by the first access point. For example, as discussed herein, this may involve a femto cell detecting the presence of a macro access terminal in the vicinity of the femto cell, under circumstances in which the macro access terminal is connected to the macro network (e.g., the macro access terminal is actively receiving information from the second access point from time to time). The detection of the access terminal may be performed in various ways as described herein (e.g., as described in conjunction with FIGS. 1, 3, 4, 10, and 11).

As represented by block 204, the first access point identifies a downlink carrier frequency on which the access terminal is actively receiving information from a second access point. For example, in a case where detection of a macro access terminal is based on measurements made on an uplink carrier frequency (e.g., whereby the measurements provide an indication that the macro access terminal is transmitting on that uplink carrier frequency), the operations of block 204 may involve a femto cell identifying the downlink carrier frequency that is paired with that uplink carrier frequency. In a case where detection of a macro access terminal is based on the access terminal being recently handed-over from the femto cell to the macro cell, the operations of block 204 may involve a femto cell identifying the macro downlink carrier frequency associated with the handover target.

In some cases, the operations of block 204 may involve identifying more than one downlink carrier frequency. For example, a given macro cell may use more than one downlink carrier frequency to send information to one or more macro access terminals that are in the vicinity of the femto cell.

As represented by block 206, as a result of the detection of the access terminal at block 202, the first access point restricts transmission on the downlink carrier frequency (or frequencies) identified at block 204. The restriction of transmission (e.g., restricting beacon transmissions) may be performed in various ways as described herein (e.g., as described in conjunction with FIGS. 1, 5, 6, and 12).

In some cases, a femto cell temporarily reduces the transmit power that the femto cell uses on the identified downlink carrier frequency (or frequencies). For example, as discussed in more detail at FIG. 12, a maximum beacon transmit power parameter (e.g., determined as a function of uplink RSSI and a power adjust factor as discussed at FIG. 12) may be adjusted to control the beacon interference impact on a macro cell user. In the event the beacon power level currently used on a macro downlink carrier frequency exceeds the value of this parameter, the femto cell reduces its transmit power to this level.

In some cases, a femto cell temporarily reduces how frequently the femto cell transmits on the identified downlink carrier frequency (or frequencies). As a simplified example, in a scenario where a femto cell uses a single transmit chain to transmit beacons on three different macro downlink carrier frequencies, the femto cell may transmit a beacon on each downlink carrier frequency at a periodicity of approximately 33% duty cycle. Upon determining that transmit power is to be restricted on one of these carrier frequencies, the femto cell may reduce the periodicity by half (e.g., transmit with a 17% duty cycle) on that carrier frequency.

In some cases, a femto cell temporarily ceases transmitting on the identified downlink carrier frequency (or frequencies). For example, the femto cell may temporarily stop transmitting beacons on any macro downlink carrier frequency where such transmission may cause interference with a nearby macro access terminal.

Figure 3:
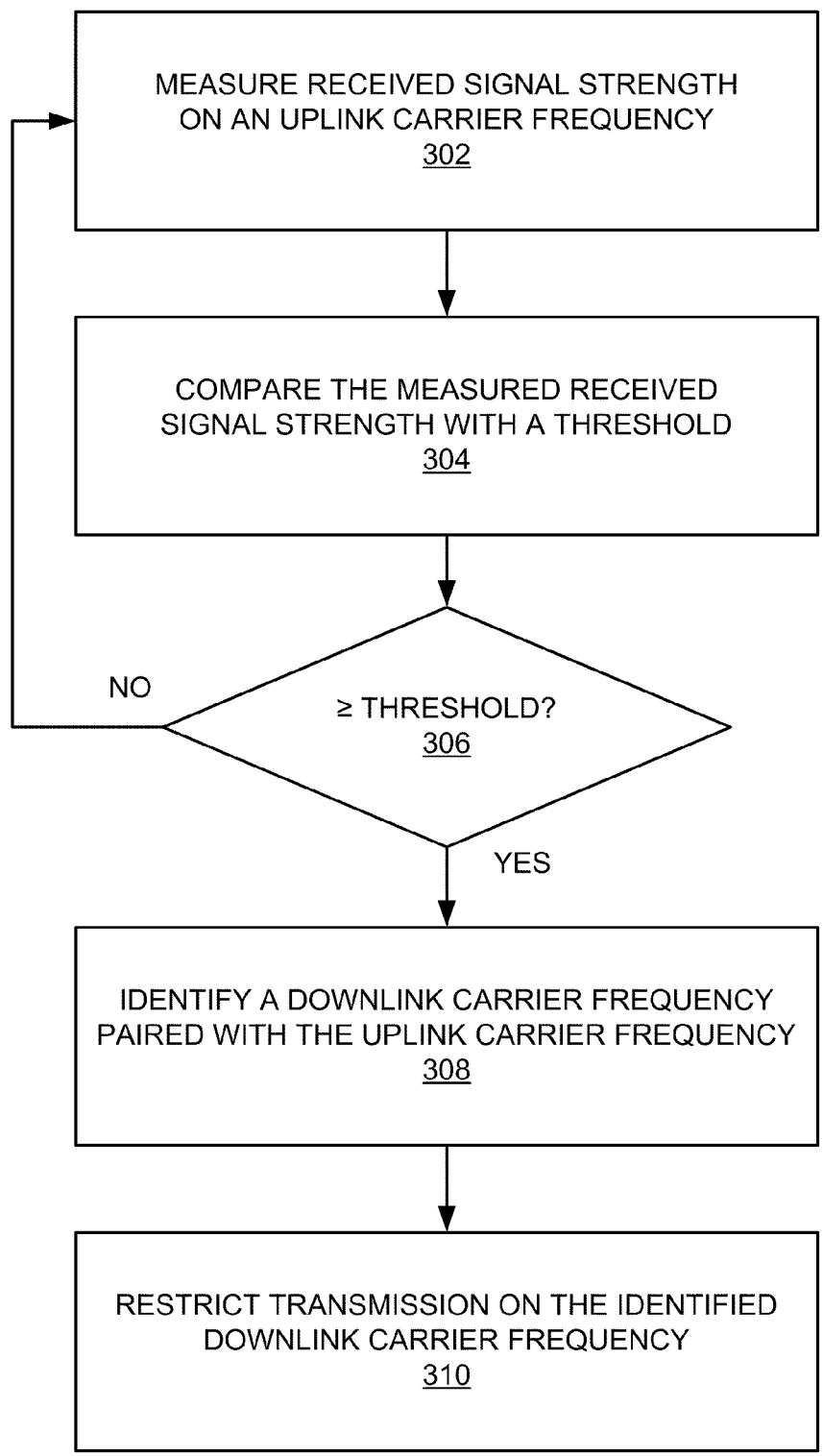
FIG. 3 is a flowchart of several sample aspects of operations that may be performed in conjunction with detecting an access terminal based on received signal strength.
Figure 4:
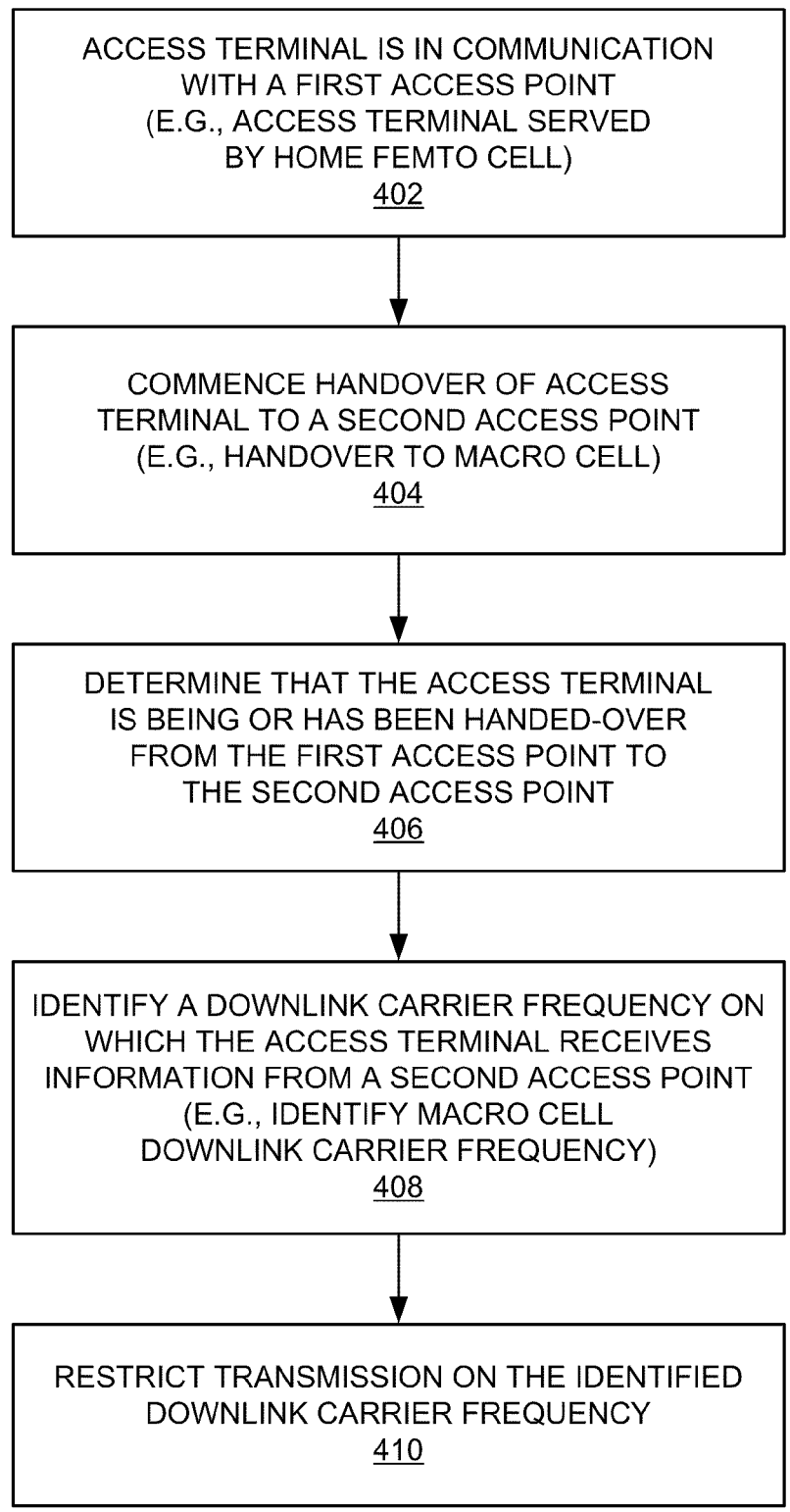
FIG. 4 is a flowchart of several sample aspects of operations that may be performed in conjunction with detecting an access terminal based on handover of the access terminal.

As mentioned above, various techniques may be used to detect an access terminal. FIGS. 3 and 4 describe sample operations that may be employed for two of these techniques.

Referring initially to FIG. 3, in some implementations a femto cell detects a nearby macro access terminal by measuring the signal strength (e.g., RSSI) received on macro cell uplink frequencies (which are paired with macro cell downlink frequencies). The received signal strength may be measured over a certain duration and some form of filtering (e.g., FIR filtering, simple averaging over certain time window) may be applied to remove channel fading effects and obtain a filtered received signal strength measurement. Thus, in some cases, measured received signal strength (e.g., RSSI) as described herein may comprise received signal strength information that was measured over a period of time and then filtered in some manner. Here, if a macro cell user is in the vicinity of the femto cell, the received signal strength measured by the femto cell is likely to be relatively high. Thus, when the measured received signal strength exceeds a certain expected value (e.g., RSSI value), the femto cell may assume the presence of a nearby active macro cell user. The femto cell may then restrict its transmissions (e.g., apply beacon throttling) to protect the user from interference.

FIG. 3 illustrates sample operations that may be performed by an access point (or some other suitable entity) to detect the presence of an access terminal based on received signal strength (e.g., RSSI). As represented by block 302, the access point (e.g., comprising a femto cell) measures received signal strength on an uplink carrier frequency. As represented by blocks 304 and 306, the access point compares the measured received signal strength with a threshold. If the measured received signal strength is greater than or equal to the threshold, detection of at least one access terminal on the uplink carrier frequency is thereby indicated. Otherwise, the access point continues measuring the received signal strength and comparing the result to the threshold (blocks 302-306). As represented by block 308, in the event detection of an access terminal (or access terminals) was indicated at block 306, the access point identifies each downlink carrier frequency that is paired with each identified uplink carrier frequency. As represented by block 310, the access point then restricts its transmission on the identified downlink carrier frequency or frequencies (e.g., as discussed herein).

As mentioned above, the operations of FIG. 3 may be performed for multiple carrier frequencies. For example, if the access point is transmitting on multiple downlink carrier frequencies, the access point may measure the received signal strength on each of the corresponding uplink carrier frequencies (e.g., on a round robin basis in the case where a single receive chain is used for this monitoring) to determine whether there are any nearby active macro users on those frequencies.

When a femto cell is radiating beacons on multiple macro carrier frequencies, the femto cell may regularly (e.g., continuously) monitor received signal strength (e.g., RSSI) on different uplink carrier frequencies to provide protection to macro users that may be active on these macro carrier frequencies. In such a scenario, the femto cell may synchronize its received signal strength measurements on different frequencies with the schedule used for beacon transmissions (i.e., beacon transmission timing). For example, if beacons are transmitted on carrier frequencies F1_downlink, F2_downlink, and F3_downlink, the femto cell may measure received signal strength on carrier frequencies F1_uplink, F2_uplink, and F3_uplink, respectively, to protect active macro users on the downlink frequencies. The femto cell may then synchronize its received signal strength measurements such that a received signal strength estimate on carrier frequency Fi_uplink (e.g., i=1, 2, or 3) is available prior to (e.g., within a defined period of time of) the transmission of a beacon on carrier frequency Fi_downlink.

Similarly, an access point may synchronize restriction of transmission with the measurement of received signal strength. For example, in a case where a detection of an access terminal (and, hence, a decision to restrict transmission) is based on measured signal strength, the access terminal may ensure that the measurement is performed within a defined period of time of the restriction of transmission. In this way, the access point may ensure that a decision to restrict transmission is based on relatively current information.

FIG. 4 illustrates sample operations that may be performed by an access point (or some other suitable entity) to detect the presence of an access terminal based on a recent handover of the access terminal. Here, it may be desirable to protect a recently handed-over access terminal from interference from the access point. Thus, upon active handover of an access terminal from a first access point (e.g., a femto cell) to a second access point (e.g., a macro cell), the first access point uses its knowledge that there is an active user in the vicinity and applies beacon throttling to protect this user as taught herein.

As represented by block 402 of FIG. 4, initially an access terminal is in communication with a first access point. For example, a home access terminal may be served by its home femto cell. As another example, in a scenario where a femto cell provides signaling-only access (or hybrid access), a non-home user (e.g., as a restricted user) may be allowed to connect to the femto cell for idle mode service (e.g. receiving and sending paging messages).

As represented by block 404, at some point in time, handover (i.e., hand-out) of the access terminal from the first access point to a second access point may be commenced. For example, a home access terminal may be leaving the immediate vicinity of its home femto cell and need to acquire service from the macro network. As another example, when a non-home user that has signaling-only access at a femto cell initiates (or receives) a call, the femto cell may handover this user to the macro network. As represented by block 406, the first access point will thus determine that the access terminal is being handed-over or has been handed-over.

As represented by block 408, as a result of the determination of block 406, the first access point identifies a downlink carrier frequency on which the access terminal receives information from the second access point. For example, during the handover operation, a femto cell will direct the access terminal to handover to one macro frequency (out of several possible macro frequencies) and receive service from a macro cell on that frequency (or frequencies).

As represented by block 410, the access point then restricts its transmission on the identified downlink carrier frequency (e.g., as discussed herein). It should be appreciated that that the operations of FIG. 4 may be performed for multiple carrier frequencies and multiple access terminals. The transmission may be restricted prior to initiating handover in order to ensure successful handover. Thus, the access point may synchronize handover and restriction of transmission.

Figure 5:
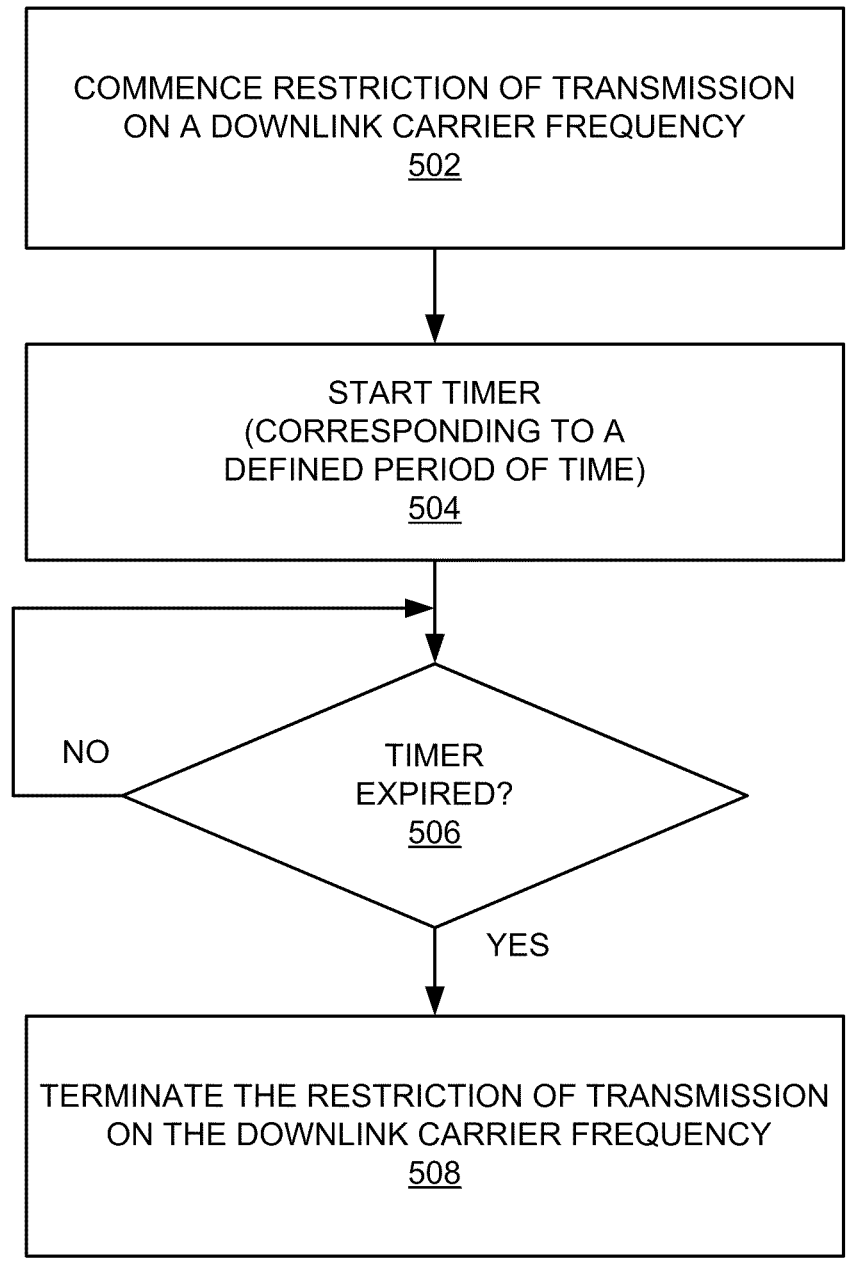
FIG. 5 is a flowchart of several sample aspects of operations that may be performed in conjunction with restricting transmission for a defined period of time.
Figure 6:
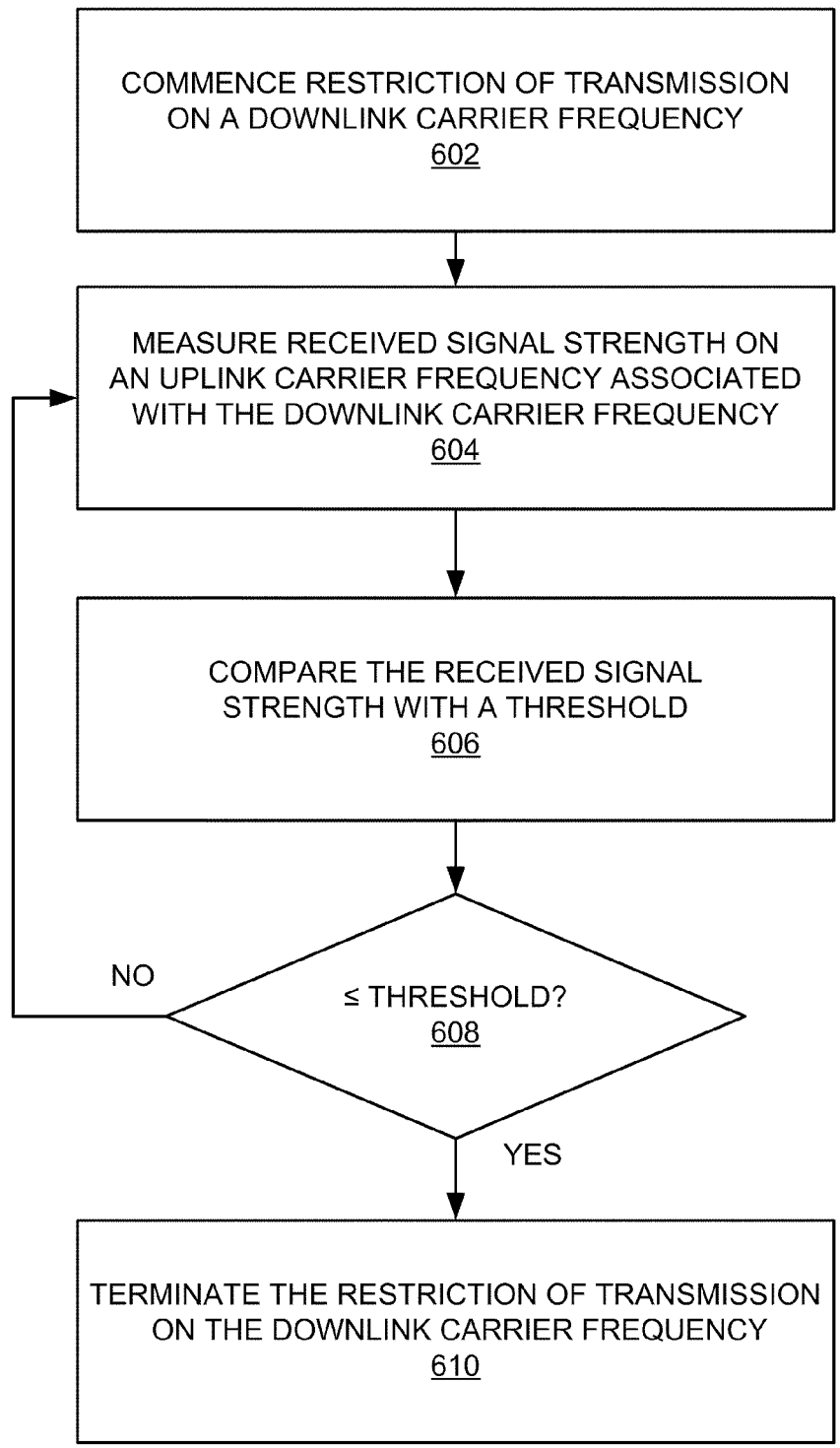
FIG. 6 is a flowchart of several sample aspects of operations that may be performed in conjunction with terminating restriction of transmission based on received signal strength.

As mentioned above, various techniques may be used to determine when to terminate a restriction of transmission. FIGS. 5 and 6 describe sample operations that may be employed for two of these techniques.

Referring initially to FIG. 5, this flowchart describes sample operations that may be performed in an implementation where transmission is restricted for a defined period of time. As represented by block 502, at some point in time, an access point commences restriction of transmission on a downlink carrier frequency (e.g., based on detection of an access terminal as discussed herein). As represented by block 504, a timer is started when the restriction of transmission is commenced. As represented by blocks 506 and 508, once the timer expires (i.e., after a defined period of time), the access point terminates the restriction of transmission on the identified downlink carrier frequency. Consequently, the access point may use the transmission parameters (e.g., transmit power and/or periodicity) that were employed before transmission was restricted. In one sample implementation, the duration of the timer is on the order of 10 minutes. In addition, there may be a count of the total time for which transmission was restricted in last X hours. If this total time exceeds some threshold, transmissions may not be restricted for the next Y hours (e.g., if transmission was restricted for a total of 30 minutes in the last 1 hour, then transmission may not be restricted for next 0.5 hour). This ensures that regular transmissions are not severely affected due to restriction of transmission.

FIG. 6 describes sample operations that may be performed in an implementation where transmission is restricted until the measured received signal strength on an uplink carrier frequency drops back below a threshold. As represented by block 602, at some point in time, an access point commences restriction of transmission on a downlink carrier frequency (e.g., based on detection of an access terminal as discussed herein). As represented by block 604, the access point regularly measures received signal strength on the uplink carrier frequency associated with the downlink carrier frequency on which transmission is restricted. As represented by blocks 606 and 608, the access point compares the measured received signal strength with a threshold. If the measured received signal strength is less than or equal to the threshold (e.g., thereby indicting that the access terminal is no longer actively operating in the vicinity of the access point), the access point terminates the restriction of transmission on the identified downlink carrier frequency as represented by block 610. Consequently, the access point may use the transmission parameters (e.g., transmit power and/or periodicity) that were employed before transmission was restricted. Conversely, if the measured received signal strength exceeds the threshold at block 608 (e.g., thereby indicting that the access terminal is still actively operating in the vicinity of the access point), the access point continues measuring the received signal strength and comparing the result to the threshold (blocks 604-608).

Figure 7:
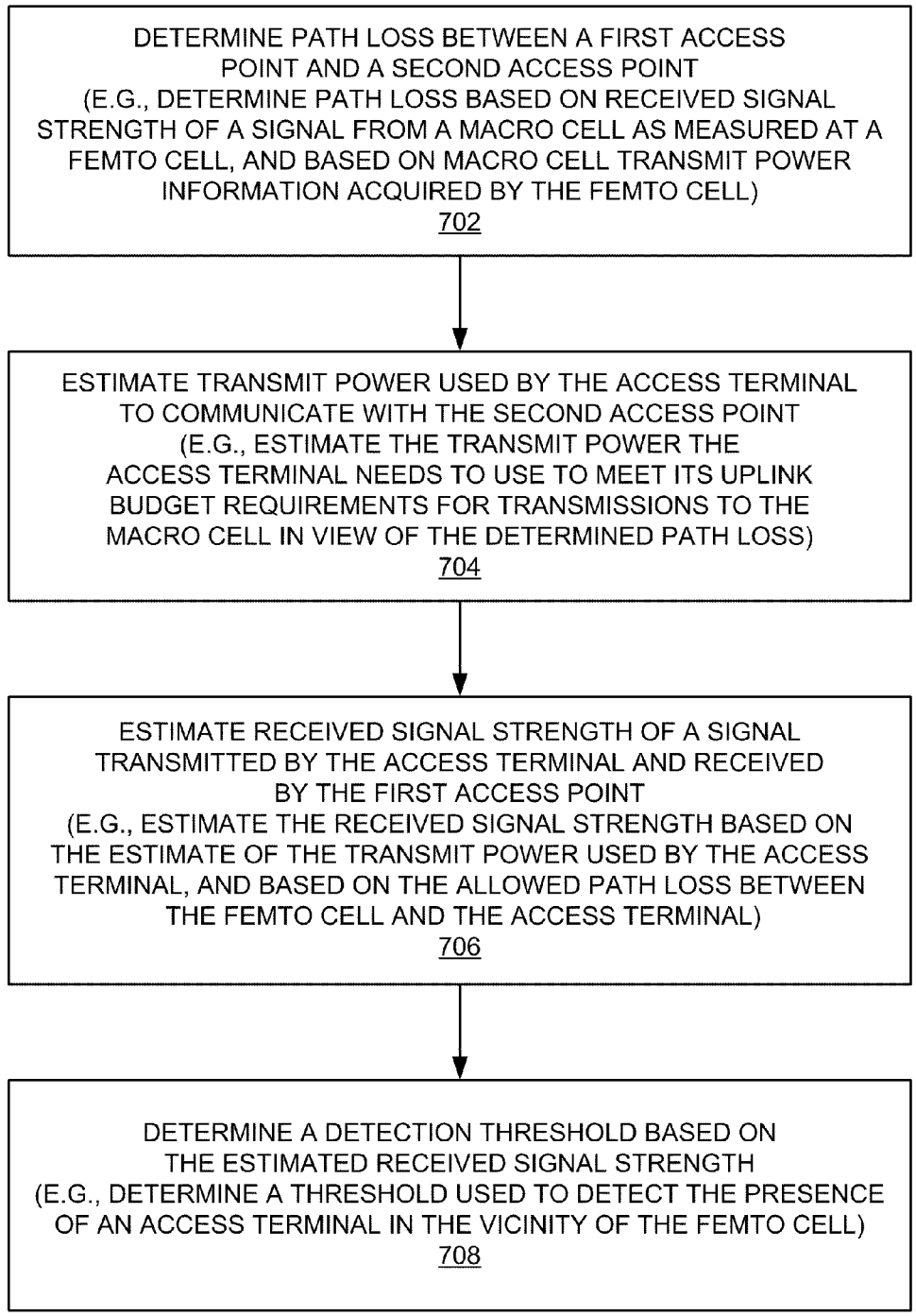
FIG. 7 is a flowchart of several sample aspects of operations that may be performed in conjunction with determining a detection threshold based on estimated received signal strength.
Figure 8:
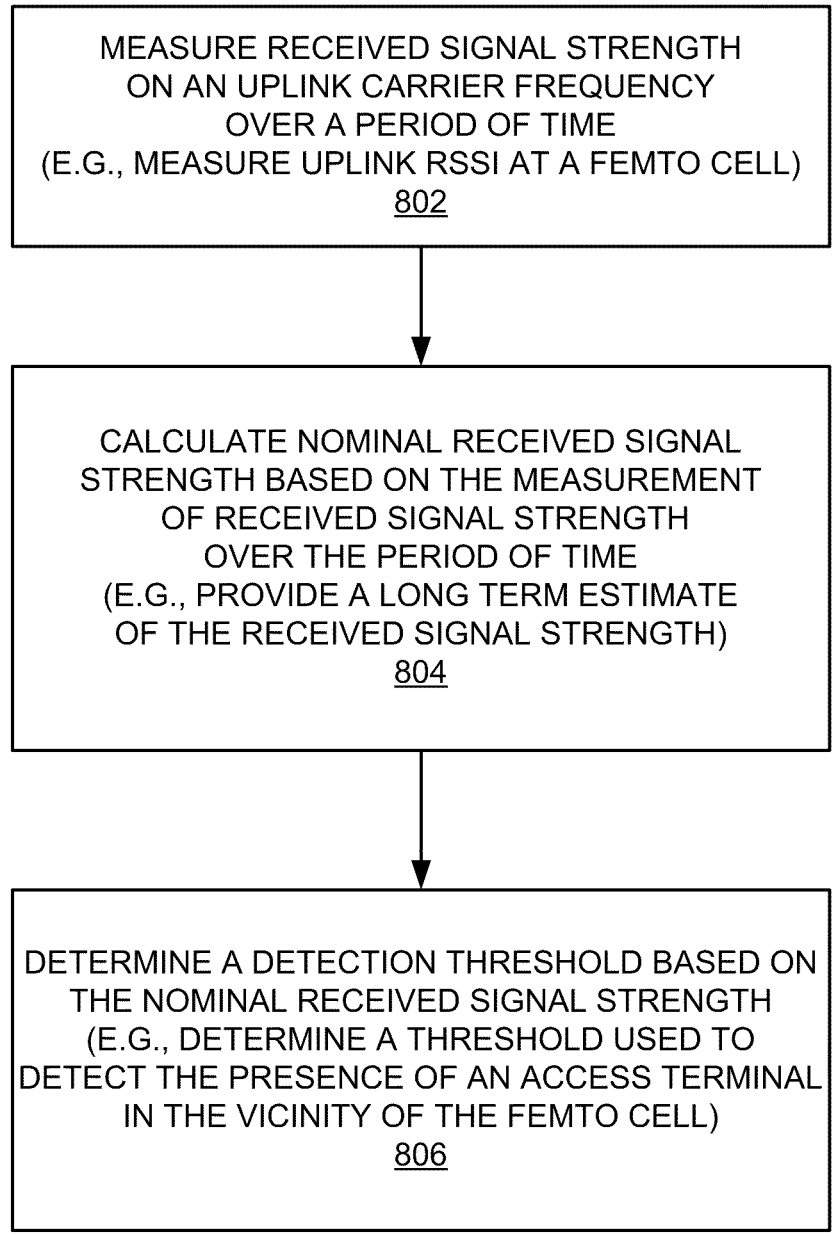
FIG. 8 is a flowchart of several sample aspects of operations that may be performed in conjunction with determining a detection threshold based on a nominal received signal strength.
Figure 9:
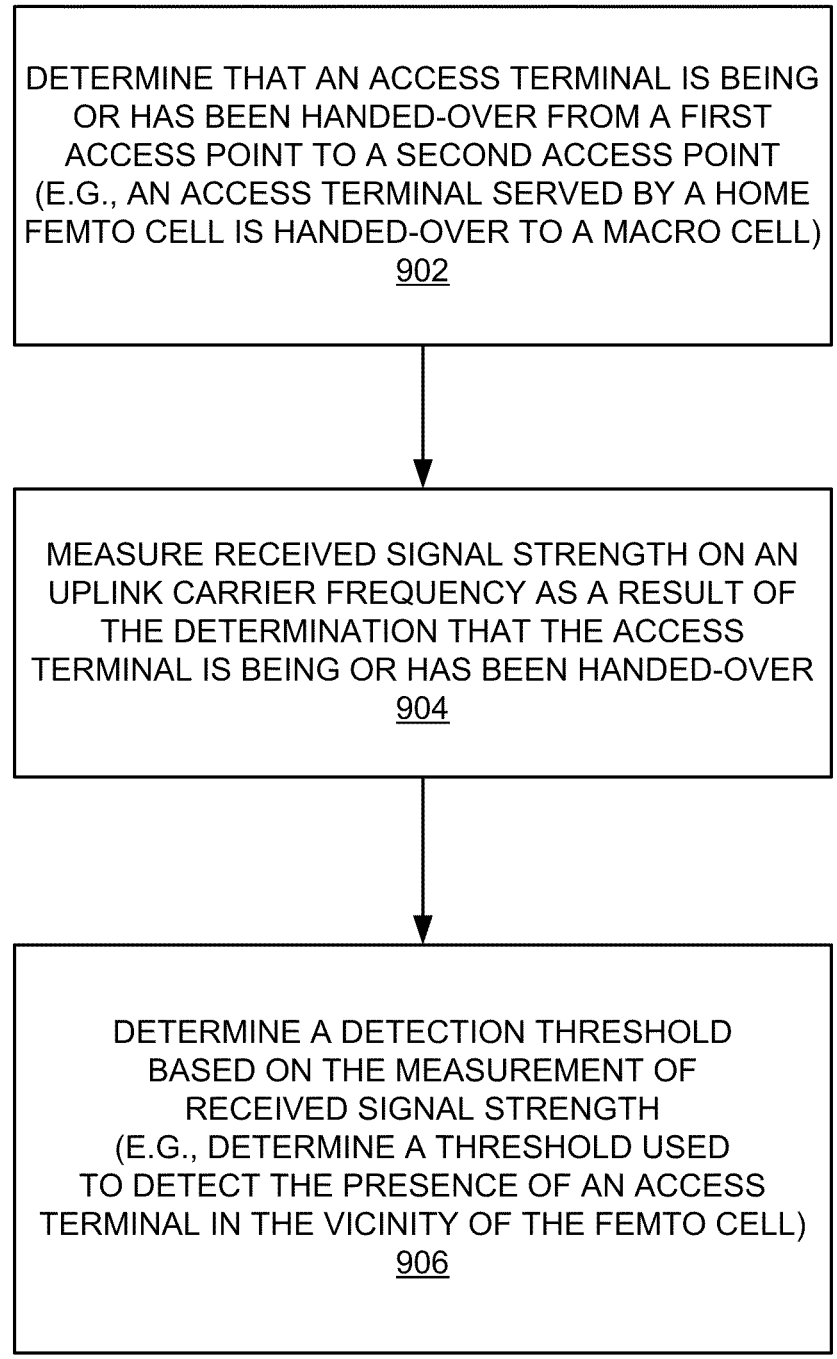
FIG. 9 is a flowchart of several sample aspects of operations that may be performed in conjunction with determining a detection threshold based on measured received signal strength after handover of an access terminal.

Various techniques may be used to determine a threshold (e.g., define a RSSI-based threshold) that is used to detect an access terminal. FIGS. 7, 8, and 9 describe sample operations that may be employed, for example, to provide the threshold of block 304.

FIG. 7 describes sample operations that may be employed at a first access point to define a threshold based on the estimated transmit power of a nearby access terminal (e.g., an active macro cell user).

As represented by block 702, a first access point (e.g., comprising a femto cell) determines the path loss between itself and a second access point (e.g., comprising a macro cell). Here, the first access point may measure the received signal strength of a signal from the second access point. In addition, the first access point may acquire information (e.g., from the network over the backhaul or based on some information transmitted by the second access point) that indicates the transmit power that the second access point used to transmit the signal. The path loss (PL_Femto_Macro) may be calculated based on this transmit power and received signal strength. This path loss serves as an estimate of path loss between an access terminal and the second access point when the access terminal is in the vicinity of the first access point.

As represented by block 704, the first access point estimates the transmit power used by a nearby access terminal to communicate with the second access point. This estimate is based on the path loss calculated at block 702 (which approximates the path loss between the access terminal and the second access point) and a corresponding uplink link budget requirement for the second access point. That is, the estimated transmit power (Mobile_Tx_Power) is the amount of power that is needed to meet the link budget requirement (e.g., for a typical voice call) at the second access point in view of the approximated path loss between the access terminal and the second access point.

As represented by block 706, the first access point estimates the received signal strength that is expected at the first access point for a signal transmitted by the access terminal. This received signal strength is calculated based on the estimated access terminal transmit power derived at block 704 and the allowed path loss between the first access point and the access terminal (PL_Femto_MacroUser). For example, an estimate of the RSSI expected from a macro cell user at a femto cell may be calculated as: Uplink_RSSI_Expected=Mobile_Tx_Power−PL_Femto_MacroUser.

As represented by block 708, the first access point determines a detection threshold based on the estimated received signal strength calculated at block 706. For example, additional margin may be added to the Uplink_RSSI_Expected value described above. Thus, at some future point in time, the first access point may compare this threshold with a current measurement of uplink received signal strength to determine whether a macro access terminal is in the vicinity of the first access point.

FIG. 8 describes sample operations that may be employed to define a threshold based on received signal strength measurements made over a period of time. For example, when an active macro user is in the vicinity of a femto cell, the received signal strength measured at the femto cell is likely to exceed the long term received signal strength estimate. Accordingly, this estimate may provide an indication of the presence of an active macro user in the vicinity of the femto cell. As a specific example, a femto cell may estimate the nominal long term uplink RSSI (RSSI_Long_Term) due to macro traffic over a certain period and calculate an expected RSSI value based on the formula: RSSI_Expected (dBm)=RSSI_Long_Term (dBm)+Delta [dB], where Delta may be a configurable parameter (e.g., 10 dB).

Referring now to the operations of FIG. 8, as represented by block 802, an access point measures received signal strength on an uplink carrier frequency over a period of time (e.g., over a several days, or over several days only at night). As represented by block 802, the access point calculates a nominal (e.g., average) received signal strength based on the measurements made over the period of time. In this way, a long term estimate of the received signal strength expected on that uplink carrier frequency may be generated. As represented by block 806, the first access point determines a detection threshold based on the nominal received signal strength calculated at block 804. For example, additional margin may be added to the nominal received signal strength value. The first access point may then compare this threshold with the received signal strength it measures at a later point in time to determine whether a macro access terminal is in the vicinity of the first access point at that point in time.

FIG. 9 describes sample operations that may be employed to define a threshold based on measurements taken shortly after an access terminal has been handed-over by an access point. For example, a femto cell may measure uplink received signal strength (e.g., RSSI) just after an active home user is handed-out from the femto cell to a macro cell (e.g., as the user moves out of femto cell coverage). The uplink received signal strength level measured just after the home user hand-out may then be used as a reference point for the received signal strength that is expected from macro users that are in the vicinity of femto cell.

Referring to the operations of FIG. 9, as represented by block 902, at some point in time a first access point determines that an access terminal is being or has been handed-over to a second access point (e.g., as discussed above at FIG. 4). Here, since the first access point controls handover of an access terminal to another access point, this determination may be made during the time of handover. As represented by block 904, as a result of the determination of block 902, the first access point measures received signal strength on the uplink carrier frequency used by the access terminal. As represented by block 906, the first access point determines a detection threshold based on the received signal strength measured at block 904. For example, the first access point may maintain a database of measurements made after access terminal handover over a period of time. The first access point may then select a certain percentile of the measurements (e.g., with additional margin added) to provide a received signal strength value (e.g., RSSI) expected to be received from a nearby active macro user. The first access point may then compare this threshold with the received signal strength it measures at a later point in time to determine whether a macro access terminal is in the vicinity of the first access point at that point in time.

Figure 10:
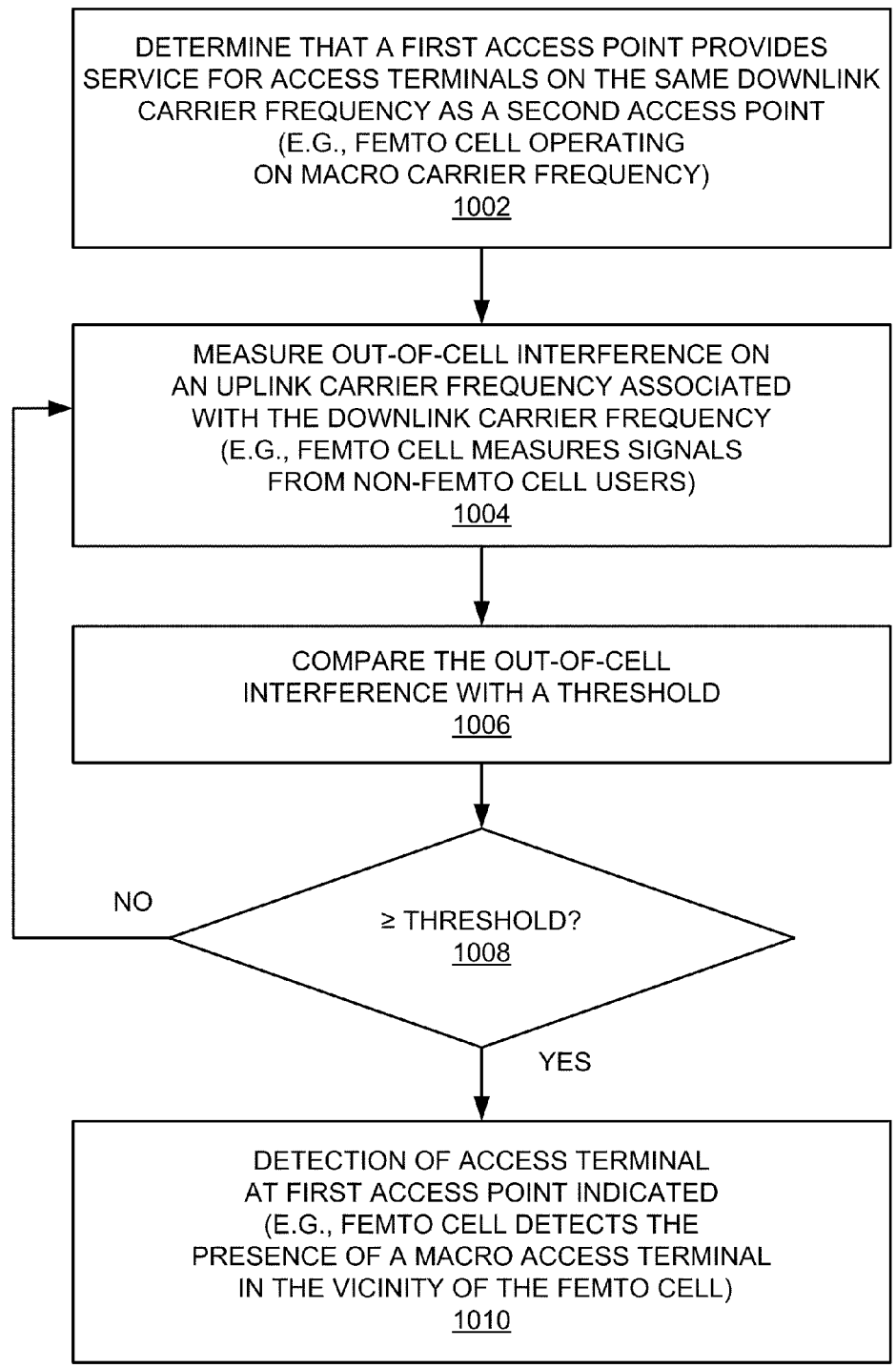
FIG. 10 is a flowchart of several sample aspects of operations that may be performed in conjunction with detecting an access terminal based on measured out-of-cell interference.

FIG. 10 describes sample operations that may be employed in an implementation where an access point detects a nearby macro access terminal by measuring out-of-cell interference. For example, the teachings herein may be used to protect active macro cell users in a situation where a femto cell and a macro cell share the same carrier frequency. In this case, instead of measuring the total received signal strength, the femto cell may measure the out-of-cell interference (Ioc) on the uplink due to non-femto cell users. If the measured Ioc exceeds a certain expected Ioc level, the femto cell may reduce its downlink transmit power to mitigate the interference impact on active non-femto cell users (e.g., macro cell users). The downlink transmit power may be reduced, for example, on common channels, on overhead channels (e.g., pilot channel, paging channel), on traffic channels, or on some combination of these and/or other channels.

Referring to the operations of FIG. 10, as represented by block 1002, a first access point (e.g., comprising a femto cell) determines that it provides service for access terminals on the same downlink carrier frequency as a second access point (e.g., comprising a macro cell). Based on this determination, the first access point measures out-of-cell interference on an uplink carrier frequency associated with the downlink carrier frequency used by the first access point. As represented by blocks 1006 and 1008, the first access point compares the out-of-cell interference with a threshold. If the out-of-cell interference is greater than or equal to the threshold, detection of at least one access terminal at the first access point is thereby indicated as represented by block 1010. The access point then restricts its transmission on the identified downlink carrier frequency (e.g., as discussed herein). If the out-of-cell interference is less than the threshold, the first access point continues measuring the received signal strength and comparing the result to the threshold (blocks 1004-1008).

Figure 11:
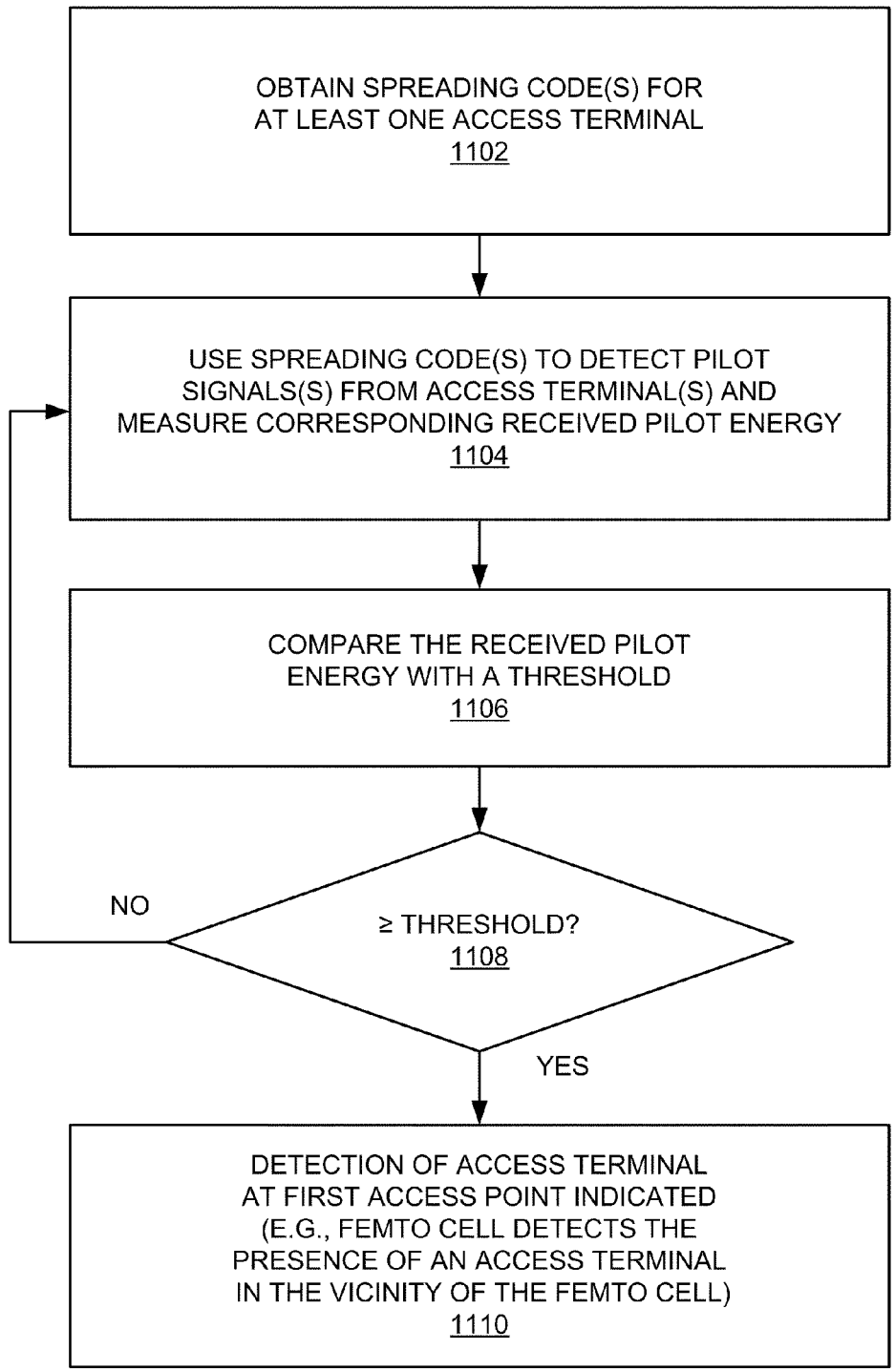
FIG. 11 is a flowchart of several sample aspects of operations that may be performed in conjunction with detecting an access terminal through the use of a spreading code.

FIG. 11 describes sample operations that may be employed in an implementation where an access point uses a spreading code to detect a nearby macro access terminal. For example, instead of measuring uplink received signal strength, a femto cell may measure pilot energy transmitted by an active macro user to detect its presence. In this case, the femto cell may measure pilot energy received on different spreading masks (e.g., long code masks in a cdma2000 system) that are used by mobiles for uplink transmission. Here, the femto cell may be provided (e.g., by the network either dynamically in real-time or through pre-provisioning) with one or more specific spreading masks that the femto cell may then use to search for specific access terminals, or the femto cell may blindly search across all possible spreading masks to detect the presence of an active user.

Referring to the operations of FIG. 11, as represented by block 1102, an access point obtains one or more spreading codes that are allocated to access terminals in the network. As discussed herein, the access point may obtain an indication of specific spreading codes that are allocated to specific access terminals, or the access point may obtain an indication of all of the spreading codes that are used in the network. As represented by block 1104, the access point uses the spreading codes to detect pilot signals from any nearby access terminals and measures the corresponding received pilot energy. As represented by blocks 1106 and 1108, the access point compares the received pilot energy with a threshold. If the received pilot energy is greater than or equal to the threshold, detection of at least one access terminal at the access point is thereby indicated as represented by block 1110. The access point then restricts its transmission (e.g., as discussed herein) on a downlink carrier frequency corresponding to the uplink carrier frequency on which the pilot signal was received. If the received pilot energy is less than the threshold at block 1108, the access point continues the pilot signal detection and received pilot energy measurement operations and, as warranted, compares the result to the threshold (blocks 1104-1108).

Figure 12:
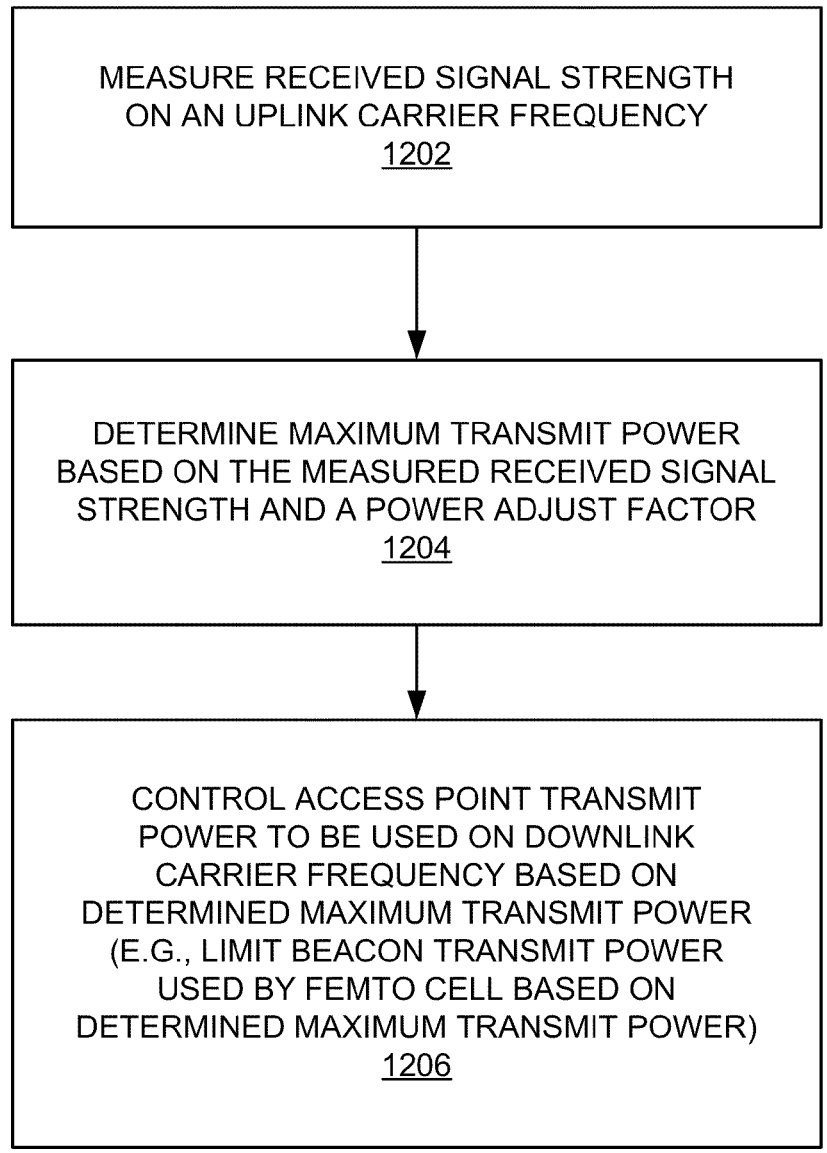
FIG. 12 is a flowchart of several sample aspects of operations that may be performed in conjunction with controlling transmit power.

FIG. 12 describes sample operations that may be employed in an implementation where the maximum transmit power to be used by an access point to restrict transmission is defined based on measured received signal strength (e.g., filtered received signal strength based on measurements over a certain duration). As represented by block 1202, the access point measures received signal strength on an uplink carrier frequency. As represented by block 1204, the access point determines the maximum transmit power based on the measured received signal strength and a power adjust factor. For example, the maximum beacon transmit power that a femto cell may use while still providing active macro cell user protection from interference may be determined as a function of the uplink RSSI. Here, the permissible beacon transmit power Ptx_Max may be chosen, for example, as Ptx_Max=PowerAdjustFactor÷RSSI or Ptx_Max=PowerAdjustFactor÷(RSSI−$N_o$), where the factor PowerAdjustFactor is a configurable parameter that may be chosen to control beacon interference impact on a macro cell user and $N_o$ is the thermal noise floor on the uplink frequency. $N_o$ may be preconfigured to the expected noise floor based on the access point's receiver RF design or may be estimated as the minimum value of RSSI observed over a long duration (e.g., over several days). As represented by block 1206, the access point then controls the transmit power to be used on a downlink carrier frequency (that corresponds to the uplink carrier frequency on which the received signal strength was measured) based on the maximum transmit power.

For purposes of further illustration, an example of an algorithm that may be employed to adjust beacon transmit power follows. In this example, Ptx_current(Fi_dl) is the current power level used to transmit a beacon on the downlink (DL or dl) carrier frequency Fi. The femto cell determines the RSSI (Uplink_RSSI) on the corresponding uplink (UL or ul) frequency Fi_ul. Next, the femto cell computes the permissible beacon transmit power that limits the impact of beacon interference on an active macro user as Ptx_max(Fi_dl)=PowerAdjustFactor÷(UL_RSSI(Fi_ul)−$N_o$). Here, $N_o$ is a noise floor of the femto cell. A different PowerAdjustFactor may be used on different downlink frequencies.

The PowerAdjustFactor may be chosen as PowerAdjustFactor=Pdl_traffic_channel_est×Nt_macro_ul_est, where Pdl_traffic_channel_est is an estimate of the downlink traffic channel power allocated for an active user by the macro cell and Nt_macro_ul_est is an estimate of the typical total received signal (thermal noise plus in-cell and out-of-cell interference) by a macro cell on the uplink due to uplink traffic.

The Pdl_traffic_channel_est estimate may be generated by measuring the macro downlink channel quality (e.g., macro pilot energy) using network listen functionality and downlink link budget requirements.

Alternatively, downlink traffic channel power allocated to a macro cell user may be estimated based on the knowledge of the macro cell's total downlink transmit power as well as the minimum (Pdl_traffic_channel_min) and maximum transmit power (Pdl_traffic_channel_max), which is typically available to the femto cell (e.g., via network provisioning). For example, a femto cell may set Pdl_traffic_channel_est equal to: Pdl_traffic_channel_min, Pdl_traffic_channel_max, or an average of these minimum and maximum values. Setting Pdl_traffic_channel_est to the minimum value Pdl_traffic_channel_min may significantly limit the interference impact of beacon transmission at the cost of reduced beacon transmission.

Similarly, Nt_macro_ul_est may be provisioned into the femto cell based on nominal macro uplink traffic conditions or the femto cell may estimate this value on its own based on nominal macro uplink traffic conditions and uplink link budget requirements.

Finally, if Ptx_current(Fi_dl)>Ptx_max(Fi_dl), then the femto cell reduces its beacon transmit power on frequency Fi_dl to Ptx_max(Fi_dl) level. Otherwise, the femto cell continues transmitting its beacon at the current power level. Note that if Ptx_max(Fi_dl) is less than the minimum transmit power level that the femto cell can transmit at, then the femto cell can completely shutdown transmission. As explained earlier, the femto cell terminates transmission restriction after the uplink RSSI falls below a threshold or other criteria for termination come into effect.

Figure 13:
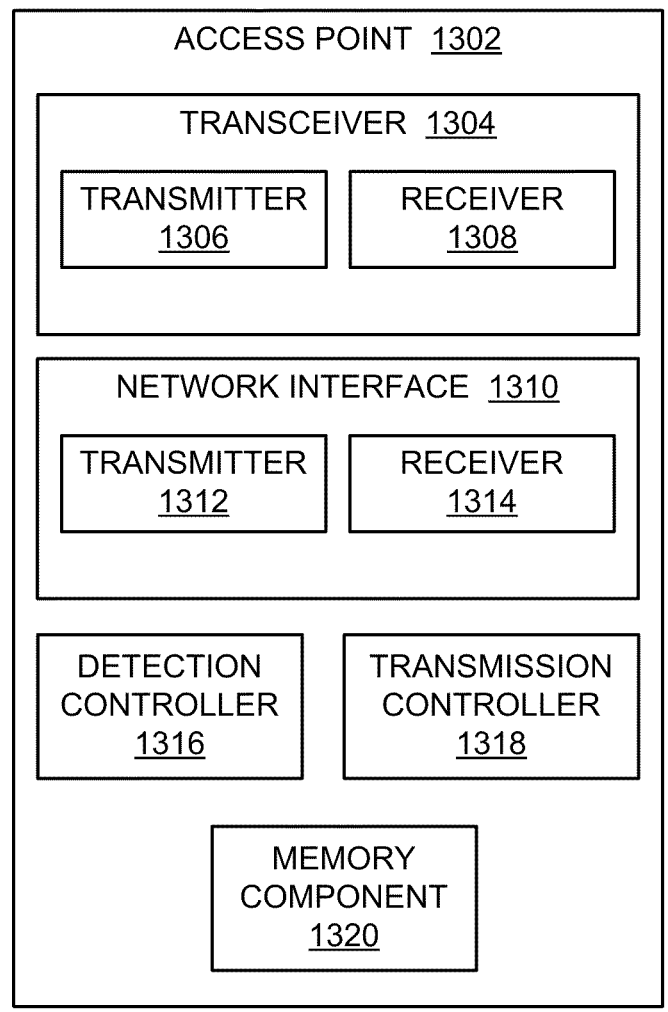
FIG. 13 is a simplified block diagram of several sample aspects of components that may be employed in communication nodes.

FIG. 13 illustrates several sample components (represented by corresponding blocks) that may be incorporated into nodes such as an access point 1302 (e.g., corresponding to the access point 104) to perform transmit control-related operations as taught herein. The described components also may be incorporated into other nodes in a communication system. For example, other nodes in a system may include components similar to those described for the access point 1302 to provide similar functionality. Also, a given node may contain one or more of the described components. For example, an access point may contain multiple transceiver components that enable the access point to operate on multiple carriers and/or communicate via different technologies.

As shown in FIG. 13, the access point 1302 includes a transceiver 1304 for communicating with other nodes. The transceiver 1304 includes a transmitter 1306 for sending signals (e.g., beacons, messages, indications) and a receiver 1308 for receiving signals (e.g., messages, indications, pilot signals).

The access point 1302 also includes a network interface 1310 for communicating with other nodes (e.g., network entities). For example, the network interface 1310 may be configured to communicate with one or more network entities via a wire-based or wireless backhaul. In some aspects, the network interface 1310 may be implemented as a transceiver (e.g., including transmitter and receiver components) configured to support wire-based or wireless communication.

Accordingly, in the example of FIG. 13, the network interface 1310 is shown as including a transmitter 1312 and a receiver 1314.

The access point 1302 includes other components that may be used in conjunction with transmit control-related operations as taught herein. For example, the access point 1302 includes a detection controller 1316 for managing the detection of access terminals (e.g., detecting an access terminal, identifying a downlink carrier frequency, synchronizing timing, determining a threshold, determining that the access point provides service for access terminals, measuring received signal strength, determining that the measured received signal strength is less than or equal to a threshold) and for providing other related functionality as taught herein. In some implementations, some or all of the functionality of the detection controller 1316 may be implemented in the receiver 1308. The access point 1302 also may include a transmission controller 1318 for controlling transmission (e.g., restricting transmission, terminating the restriction of transmission) and for providing other related functionality as taught herein. In some implementations, some or all of the functionality of the transmission controller 1316 may be implemented in the transmitter 1306. Also, the access point 1302 includes a memory component 1320 (e.g., including a memory device) for maintaining information (e.g., indications, measured values, and so on).

For convenience, the access point 1302 is shown in FIG. 13 as including components that may be used in the various examples described herein. In practice, the functionality of one or more of these blocks may be different in different embodiments. For example, the functionality of block 1316 may be different in an embodiment implemented in accordance with FIG. 3 as compared to an embodiment implemented in accordance with FIG. 4.

The components of FIG. 13 may be implemented in various ways. In some implementations the components of FIG. 13 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by blocks 1304 and 1310, and some or all of the functionality represented by blocks 1316-1320 may be implemented by a processor or processors of an access point and data memory of the access point (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 14:
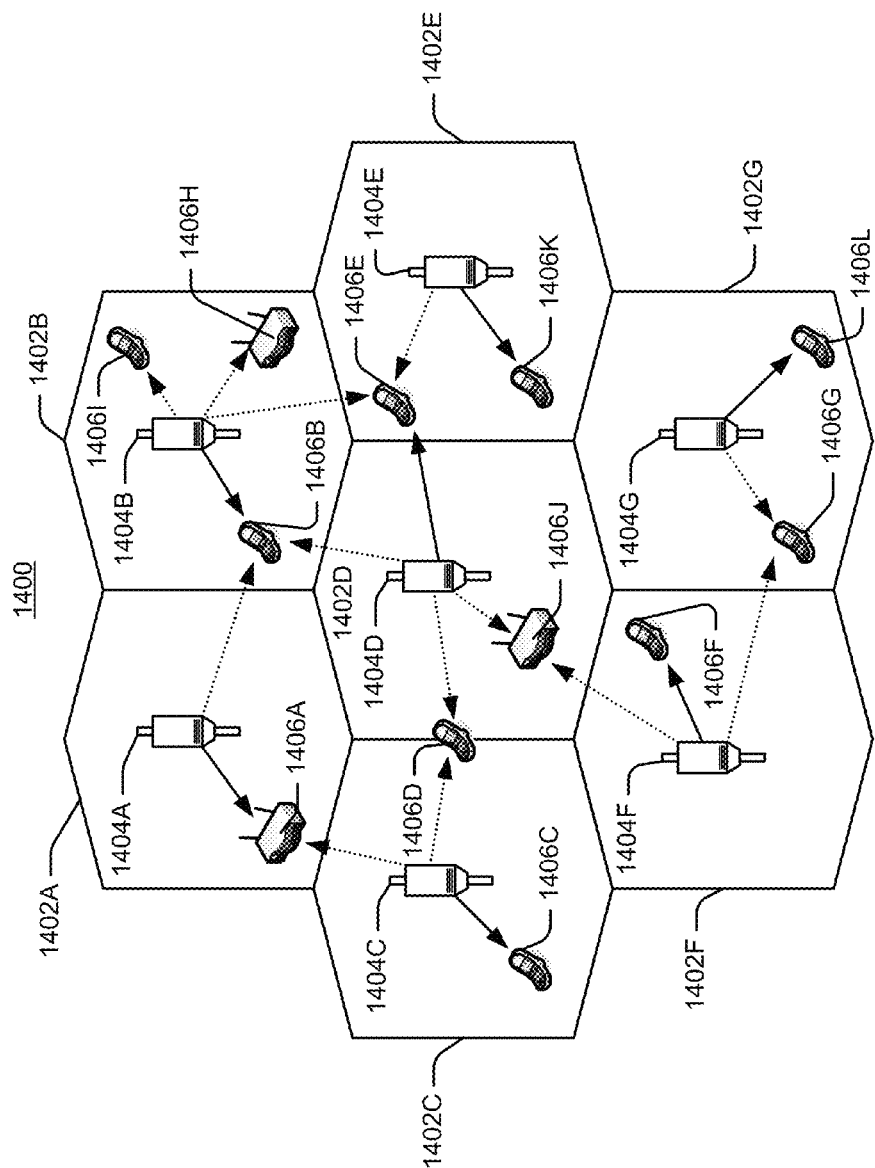
FIG. 14 is a simplified diagram of a wireless communication system.

FIG. 14 illustrates a wireless communication system 1400, configured to support a number of users, in which the teachings herein may be implemented. The system 1400 provides communication for multiple cells 1402, such as, for example, macro cells 1402A-1402G, with each cell being serviced by a corresponding access point 1404 (e.g., access points 1404A-1404G). As shown in FIG. 14, access terminals 1406 (e.g., access terminals 1406A-1406L) may be dispersed at various locations throughout the system over time. Each access terminal 1406 may communicate with one or more access points 1404 on a forward link (FL) and/or a reverse link (RL) at a given moment, depending upon whether the access terminal 1406 is active and whether it is in soft handoff, for example. The wireless communication system 1400 may provide service over a large geographic region. For example, macro cells 1402A-1402G may cover a few blocks in a neighborhood or several miles in a rural environment.

Figure 15:
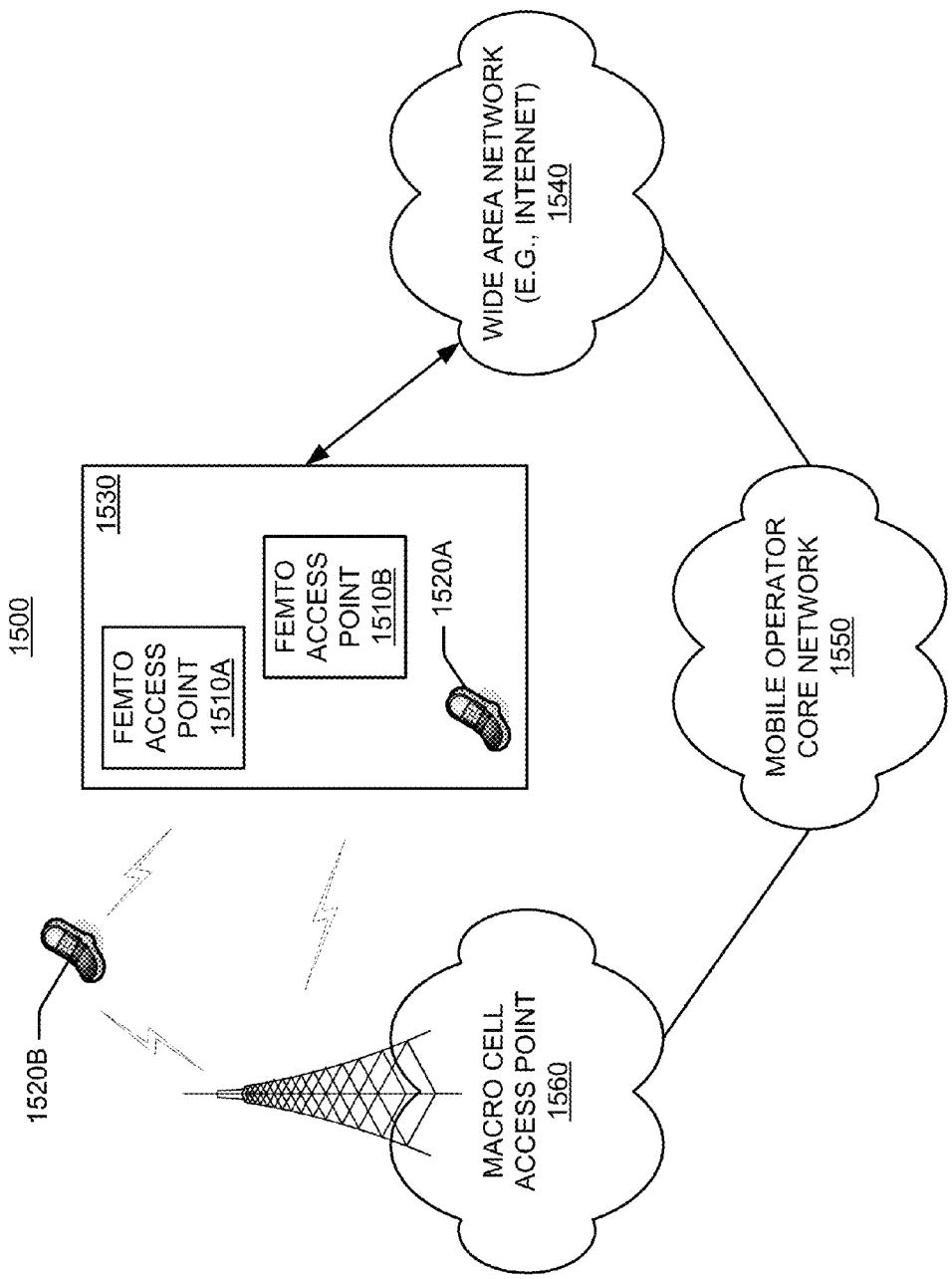
FIG. 15 is a simplified diagram of a wireless communication system including femto nodes.

FIG. 15 illustrates an exemplary communication system 1500 where one or more femto access points are deployed within a network environment. Specifically, the system 1500 includes multiple femto access points 1510 (e.g., femto access points 1510A and 1510B) installed in a relatively small scale network environment (e.g., in one or more user residences 1530). Each femto access point 1510 may be coupled to a wide area network 1540 (e.g., the Internet) and a mobile operator core network 1550 via a DSL router, a cable modem, a wireless link, or other connectivity means (not shown). As will be discussed below, each femto access point 1510 may be configured to serve associated access terminals 1520 (e.g., access terminal 1520A) and, optionally, other (e.g., hybrid or alien) access terminals 1520 (e.g., access terminal 1520B). In other words, access to femto access points 1510 may be restricted whereby a given access terminal 1520 may be served by a set of designated (e.g., home) femto access point(s) 1510 but may not be served by any non-designated femto access points 1510 (e.g., a neighbor's femto access point 1510).

Figure 16:
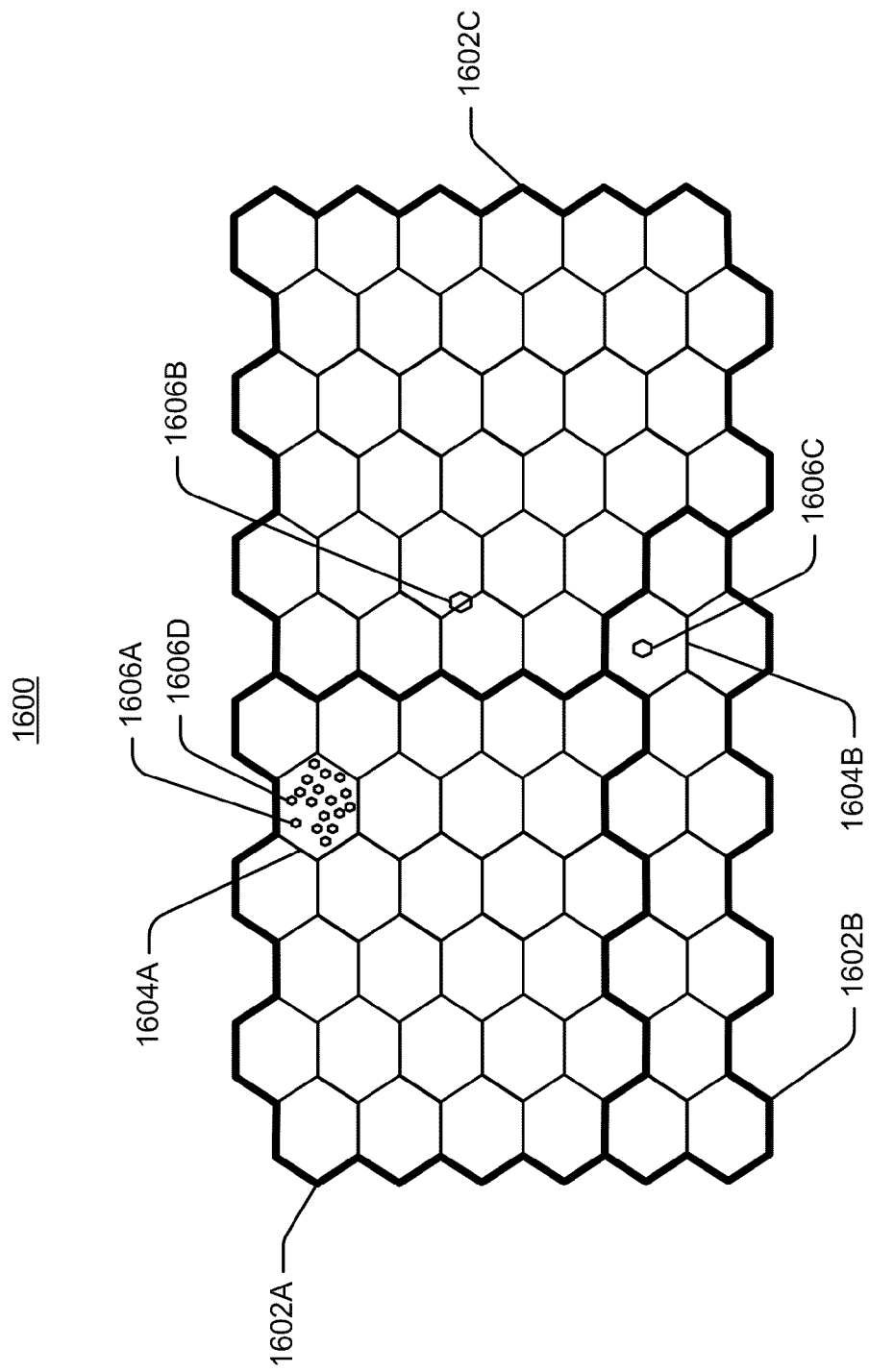
FIG. 16 is a simplified diagram illustrating coverage areas for wireless communication.

FIG. 16 illustrates an example of a coverage map 1600 where several tracking areas 1602 (or routing areas or location areas) are defined, each of which includes several macro coverage areas 1604. Here, areas of coverage associated with tracking areas 1602A, 1602B, and 1602C are delineated by the wide lines and the macro coverage areas 1604 are represented by the larger hexagons. The tracking areas 1602 also include femto coverage areas 1606. In this example, each of the femto coverage areas 1606 (e.g., femto coverage areas 1606B and 1606C) is depicted within one or more macro coverage areas 1604 (e.g., macro coverage areas 1604A and 1604B). It should be appreciated, however, that some or all of a femto coverage area 1606 may not lie within a macro coverage area 1604. In practice, a large number of femto coverage areas 1606 (e.g., femto coverage areas 1606A and 1606D) may be defined within a given tracking area 1602 or macro coverage area 1604. Also, one or more pico coverage areas (not shown) may be defined within a given tracking area 1602 or macro coverage area 1604.

Referring again to FIG. 15, the owner of a femto access point 1510 may subscribe to mobile service, such as, for example, 3G mobile service, offered through the mobile operator core network 1550. In addition, an access terminal 1520 may be capable of operating both in macro environments and in smaller scale (e.g., residential) network environments. In other words, depending on the current location of the access terminal 1520, the access terminal 1520 may be served by a macro cell access point 1560 associated with the mobile operator core network 1550 or by any one of a set of femto access points 1510 (e.g., the femto access points 1510A and 1510B that reside within a corresponding user residence 1530). For example, when a subscriber is outside his home, he is served by a standard macro access point (e.g., access point 1560) and when the subscriber is at home, he is served by a femto access point (e.g., access point 1510A). Here, a femto access point 1510 may be backward compatible with legacy access terminals 1520.

A femto access point 1510 may be deployed on a single frequency or, in the alternative, on multiple frequencies. Depending on the particular configuration, the single frequency or one or more of the multiple frequencies may overlap with one or more frequencies used by a macro access point (e.g., access point 1560).

In some aspects, an access terminal 1520 may be configured to connect to a preferred femto access point (e.g., the home femto access point of the access terminal 1520) whenever such connectivity is possible. For example, whenever the access terminal 1520A is within the user's residence 1530, it may be desired that the access terminal 1520A communicate only with the home femto access point 1510A or 1510B.

In some aspects, if the access terminal 1520 operates within the macro cellular network 1550 but is not residing on its most preferred network (e.g., as defined in a preferred roaming list), the access terminal 1520 may continue to search for the most preferred network (e.g., the preferred femto access point 1510) using a better system reselection (BSR) procedure, which may involve a periodic scanning of available systems to determine whether better systems are currently available and subsequently acquire such preferred systems. The access terminal 1520 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1510, the access terminal 1520 selects the femto access point 1510 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1510 that reside within the corresponding user residence 1530). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 17:
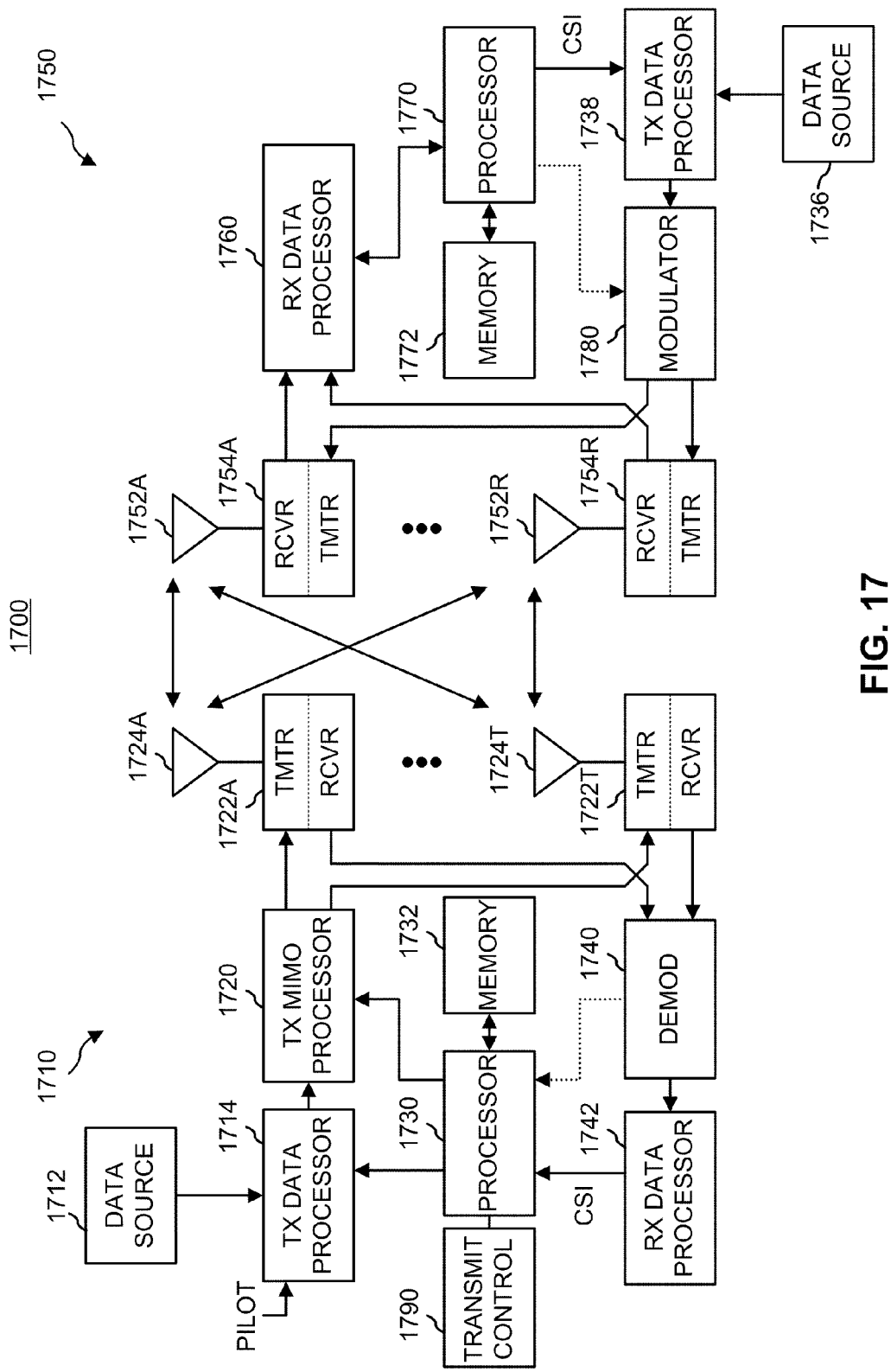
FIG. 17 is a simplified block diagram of several sample aspects of communication components.

FIG. 17 illustrates a wireless device 1710 (e.g., an access point) and a wireless device 1750 (e.g., an access terminal) of a sample MIMO system 1700. At the device 1710, traffic data for a number of data streams is provided from a data source 1712 to a transmit (TX) data processor 1714. Each data stream may then be transmitted over a respective transmit antenna.

The TX data processor 1714 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1730. A data memory 1732 may store program code, data, and other information used by the processor 1730 or other components of the device 1710.

The modulation symbols for all data streams are then provided to a TX MIMO processor 1720, which may further process the modulation symbols (e.g., for OFDM). The TX MIMO processor 1720 then provides $N_T$ modulation symbol streams to $N_T$ transceivers (XCVR) 1722A through 1722T. In some aspects, the TX MIMO processor 1720 applies beam-forming weights to the symbols of the data streams and to the antenna from which the symbol is being transmitted.

Each transceiver 1722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1722A through 1722T are then transmitted from $N_T$ antennas 1724A through 1724T, respectively.

At the device 1750, the transmitted modulated signals are received by $N_R$ antennas 1752A through 1752R and the received signal from each antenna 1752 is provided to a respective transceiver (XCVR) 1754A through 1754R. Each transceiver 1754 conditions (e.g., filters, amplifies, and downconverts) a respective received signal, digitizes the conditioned signal to provide samples, and further processes the samples to provide a corresponding "received" symbol stream.

A receive (RX) data processor 1760 then receives and processes the $N_R$ received symbol streams from $N_R$ transceivers 1754 based on a particular receiver processing technique to provide $N_T$ "detected" symbol streams. The RX data processor 1760 then demodulates, deinterleaves, and decodes each detected symbol stream to recover the traffic data for the data stream. The processing by the RX data processor 1760 is complementary to that performed by the TX MIMO processor 1720 and the TX data processor 1714 at the device 1710.

A processor 1770 periodically determines which pre-coding matrix to use (discussed below). The processor 1770 formulates a reverse link message comprising a matrix index portion and a rank value portion. A data memory 1772 may store program code, data, and other information used by the processor 1770 or other components of the device 1750.

The reverse link message may comprise various types of information regarding the communication link and/or the received data stream. The reverse link message is then processed by a TX data processor 1738, which also receives traffic data for a number of data streams from a data source 1736, modulated by a modulator 1780, conditioned by the transceivers 1754A through 1754R, and transmitted back to the device 1710.

At the device 1710, the modulated signals from the device 1750 are received by the antennas 1724, conditioned by the transceivers 1722, demodulated by a demodulator (DEMOD) 1740, and processed by a RX data processor 1742 to extract the reverse link message transmitted by the device 1750. The processor 1730 then determines which pre-coding matrix to use for determining the beam-forming weights then processes the extracted message.

FIG. 17 also illustrates that the communication components may include one or more components that perform transmit control operations as taught herein. For example, a transmit control component 1790 may cooperate with the processor 1730 and/or other components of the device 1710 to control transmission from the device 1710 to another device (e.g., the device 1750) as taught herein. It should be appreciated that for each device 1710 and 1750 the functionality of two or more of the described components may be provided by a single component. For example, a single processing component may provide the functionality of the transmit control component 1790 and the processor 1730.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 18:
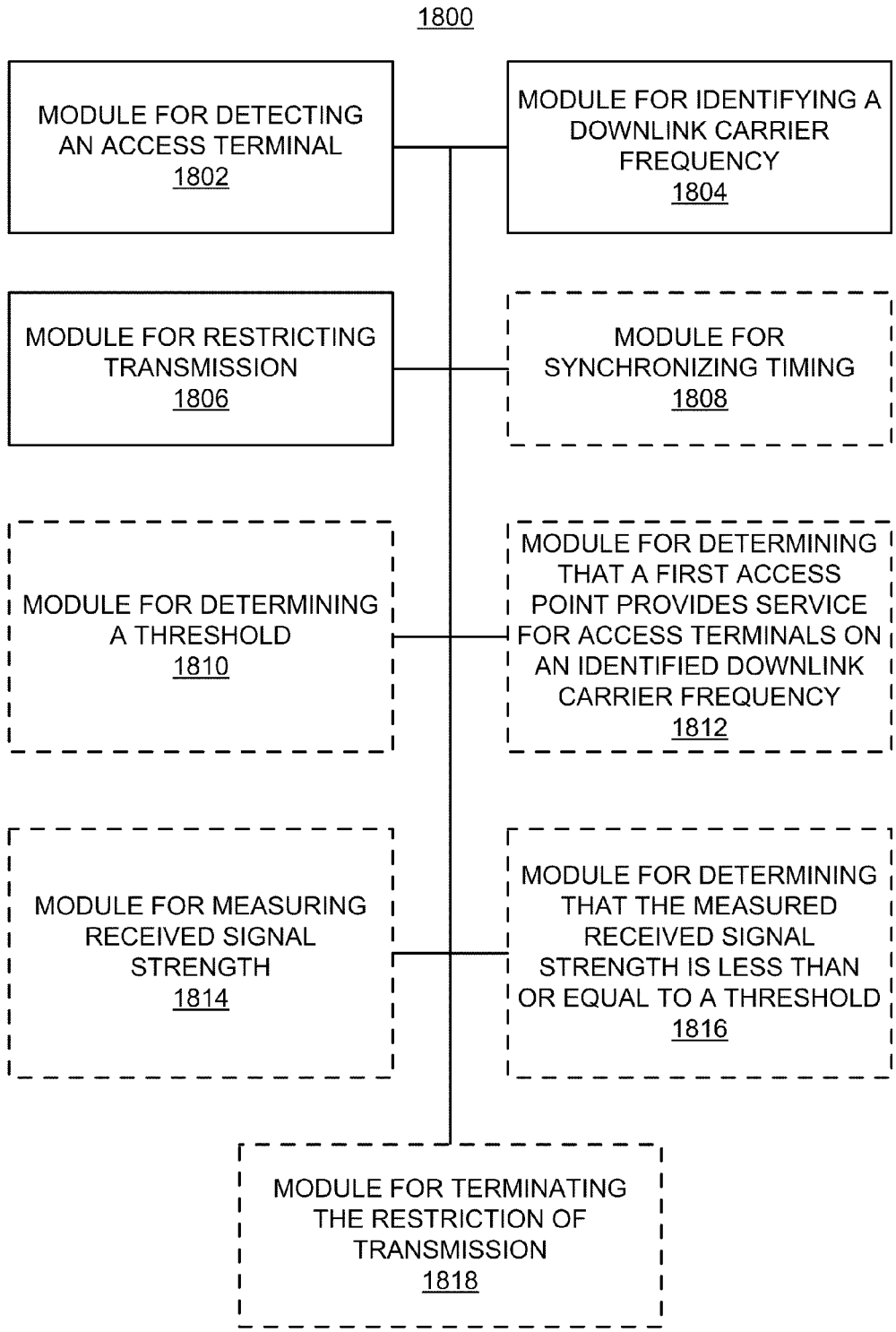
FIG. 18 is a simplified block diagram of several sample aspects of an apparatus configured to restrict transmission as taught herein.

The functionality described herein (e.g., with regard to one or more of the accompanying figures) may correspond in some aspects to similarly designated "means for" functionality in the appended claims. Referring to FIG. 18, an apparatus 1800 is represented as a series of interrelated functional modules. Here, a module for detecting an access terminal 1802 may correspond at least in some aspects to, for example, a detection controller as discussed herein. A module for identifying a downlink carrier frequency 1804 may correspond at least in some aspects to, for example, a detection controller as discussed herein. A module for restricting transmission 1806 may correspond at least in some aspects to, for example, a transmission controller as discussed herein. A module for synchronizing timing 1808 may correspond at least in some aspects to, for example, a detection controller as discussed herein. A module for determining a threshold 1810 may correspond at least in some aspects to, for example, a detection controller as discussed herein. A module for determining that a first access point provides service for access terminals on an identified downlink carrier frequency 1812 may correspond at least in some aspects to, for example, a detection controller as discussed herein. A module for measuring received signal strength 1814 may correspond at least in some aspects to, for example, a detection controller as discussed herein. A module for determining that the measured received signal strength is less than or equal to a threshold 1816 may correspond at least in some aspects to, for example, a detection controller as discussed herein. A module for terminating the restriction of transmission 1818 may correspond at least in some aspects to, for example, a transmission controller as discussed herein.

The functionality of the modules of FIG. 18 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIG. 18 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   detecting, by a first access point, an access terminal located near the first access point, wherein the access terminal is communicating with a second access point, and wherein the first access point comprises a small coverage access point;
   identifying, by the first access point, a downlink carrier frequency associated with at least the second access point on which the access terminal is communicating with the second access point, wherein the second access point comprises a macro coverage access point and measurements on the downlink carrier frequency are utilized to identify a corresponding uplink carrier frequency; and
   restricting, by the first access point, transmission of first access point information on the identified downlink carrier frequency associated with at least the second access point as a result of the detection of the access terminal for reducing potential interference at the access terminal, wherein restricting the transmission comprises temporarily reducing transmit power used by the first access point on the identified downlink carrier frequency, and wherein a maximum transmit power value for the reduced transmit power is specified based on a measurement of received signal strength on an uplink carrier frequency.

2. The method of claim 1, wherein the detection of the access terminal comprises determining that the access terminal is subject to interference from beacons transmitted by the first access point on the downlink carrier frequency.

3. The method of claim 1, wherein the detection of the access terminal comprises determining that the access terminal is being or has been handed-over from the first access point.

4. The method of claim 1, wherein the detection of the access terminal comprises:
measuring received signal strength on the uplink carrier frequency; and
comparing the measured received signal strength with a threshold.

5. The method of claim 4, wherein, if the measured received signal strength is greater than or equal to the threshold, the identification of the downlink carrier frequency comprises identifying a downlink carrier frequency that is paired with the uplink carrier frequency.

6. The method of claim 4, further comprising synchronizing timing of the measurement of received signal strength with beacon transmission timing.

7. The method of claim 4, further comprising determining the threshold based on:
allowed path loss between the first access point and the access terminal; and
estimated transmit power used by the access terminal to communicate with the second access point.

8. The method of claim 4, further comprising determining the threshold by:
measuring received signal strength on the uplink carrier frequency over a period of time;
calculating a nominal received signal strength based on the measurement of received signal strength over the period of time; and
determining the threshold based on the nominal received signal strength.

9. The method of claim 4, further comprising determining the threshold by:
determining that the access terminal has been handed-over from the first access point;
measuring received signal strength on the uplink carrier frequency as a result of the determination that the access terminal has been handed-over; and
determining the threshold based on the measurement of received signal strength as a result of the determination that the access terminal has been handed-over.

10. The method of claim 1, wherein the detection of the access terminal comprises using a spreading code to detect a pilot signal from the access terminal.

11. The method of claim 1, further comprising determining that the first access point provides service for access terminals on the identified downlink carrier frequency, wherein the detection of the access terminal comprises:
measuring out-of-cell interference on the uplink carrier frequency associated with the downlink carrier frequency; and
comparing the out-of-cell interference with a threshold.

12. The method of claim 1, wherein the restriction of transmission comprises temporarily restricting beacon transmissions by the first access point on the identified downlink carrier frequency.

13. The method of claim 1, wherein the restriction of transmission comprises reducing a periodicity at which the first access point transmits signals on the identified downlink carrier frequency.

14. The method of claim 1, wherein the restriction of transmission comprises reducing how frequently the first access point transmits beacon signals on the identified downlink carrier frequency.

15. The method of claim 1, wherein the restriction of transmission comprises temporarily ceasing transmissions by the first access point on the identified downlink carrier frequency.

16. The method of claim 1, wherein the restriction of transmission is invoked for a defined period of time.

17. The method of claim 1, further comprising:
measuring received signal strength on the uplink carrier frequency associated with the downlink carrier frequency;
determining that the measured received signal strength is less than or equal to a threshold; and
terminating the restriction of transmission as a result of the determination that the measured received signal strength is less than or equal to the threshold.

18. An apparatus for communication, comprising:
a detection controller operable to detect an access terminal located near the apparatus, wherein the access terminal is communicating with an access point, and further operable to identify a downlink carrier frequency associated with at least the second access point on which the access terminal is communicating with the access point, wherein the second access point comprises a macro coverage access point and measurements on the downlink carrier frequency are utilized to identify a corresponding uplink carrier frequency; and
a transmission controller operable to restrict transmission of first access point information by the apparatus on the identified downlink carrier frequency associated with at least the second access point as a result of the detection of the access terminal for reducing potential interference at the access terminal, wherein to restrict the transmission, the transmission controller is further operable to temporarily reducing transmit power used by the first access point on the identified downlink carrier frequency, and wherein a maximum transmit power value for the reduced transmit power is specified based on a measurement of received signal strength on an uplink carrier frequency.

19. The apparatus of claim 18, wherein the detection of the access terminal comprises determining that the access terminal is subject to interference from beacons transmitted by the first access point on the downlink carrier frequency.

20. The apparatus of claim 18, wherein the detection of the access terminal comprises determining that the access terminal is being or has been handed-over from the first access point.

21. The apparatus of claim 18, wherein the detection of the access terminal comprises:
measuring received signal strength on the uplink carrier frequency; and
comparing the measured received signal strength with a threshold.

22. The apparatus of claim 21, wherein, if the measured received signal strength is greater than or equal to the threshold, the identification of the downlink carrier frequency comprises identifying a downlink carrier frequency that is paired with the uplink carrier frequency.

23. The apparatus of claim 21, wherein the detection controller is further operable to synchronize timing of the measurement of received signal strength with beacon transmission timing.

24. The apparatus of claim 21, wherein the detection controller is further operable to determine the threshold based on:

allowed path loss between the first access point and the access terminal; and
estimated transmit power used by the access terminal to communicate with the second access point.

25. The apparatus of claim 21, wherein the detection controller is further operable to determine the threshold by:
measuring received signal strength on the uplink carrier frequency over a period of time;
calculating a nominal received signal strength based on the measurement of received signal strength over the period of time; and
determining the threshold based on the nominal received signal strength.

26. The apparatus of claim 21, wherein the detection controller is further operable to determine the threshold by:
determining that the access terminal has been handed-over from the first access point;
measuring received signal strength on the uplink carrier frequency as a result of the determination that the access terminal has been handed-over; and
determining the threshold based on the measurement of received signal strength as a result of the determination that the access terminal has been handed-over.

27. The apparatus of claim 18, wherein the detection of the access terminal comprises using a spreading code to detect a pilot signal from the access terminal.

28. The apparatus of claim 18, wherein:
the detection controller is further operable to determine that the first access point provides service for access terminals on the identified downlink carrier frequency; and
the detection of the access terminal comprises: measuring out-of-cell interference on the uplink carrier frequency associated with the downlink carrier frequency, and comparing the out-of-cell interference with a threshold.

29. The apparatus of claim 18, wherein the restriction of transmission comprises temporarily restricting beacon transmissions by the first access point on the identified downlink carrier frequency.

30. The apparatus of claim 18, wherein the restriction of transmission comprises reducing a periodicity at which the first access point transmits signals on the identified downlink carrier frequency.

31. The apparatus of claim 18, wherein the restriction of transmission comprises reducing how frequently the first access point transmits beacon signals on the identified downlink carrier frequency.

32. The apparatus of claim 18, wherein the restriction of transmission comprises temporarily ceasing transmissions by the first access point on the identified downlink carrier frequency.

33. The apparatus of claim 18, wherein the restriction of transmission is invoked for a defined period of time.

34. The apparatus of claim 18, wherein:
the detection controller is further operable to measure received signal strength on the uplink carrier frequency associated with the downlink carrier frequency;
the detection controller is further operable to determine that the measured received signal strength is less than or equal to a threshold; and
the transmission controller is further operable to terminate the restriction of transmission as a result of the determination that the measured received signal strength is less than or equal to the threshold.

35. An apparatus for communication, comprising:
means for detecting an access terminal located near the apparatus, wherein the access terminal is communicating with an access point, and wherein the first access point comprises a small coverage access point;
means for identifying a downlink carrier frequency associated with at least the second access point on which the access terminal is communicating with the access point, wherein the second access point comprises a macro coverage access point and measurements on the downlink carrier frequency are utilized to identify a corresponding uplink carrier frequency; and
means for restricting transmission of first access point information on the identified downlink carrier frequency associated with at least the second access point as a result of the detection of the access terminal for reducing potential interference at the access terminal, wherein the means for restricting the transmission comprises means for temporarily reducing transmit power used by the first access point on the identified downlink carrier frequency, and wherein a maximum transmit power value for the reduced transmit power is specified based on a measurement of received signal strength on an uplink carrier frequency.

36. The apparatus of claim 35, wherein the detection of the access terminal comprises determining that the access terminal is being or has been handed-over from the first access point.

37. The apparatus of claim 35, wherein the detection of the access terminal comprises:
measuring received signal strength on the uplink carrier frequency; and
comparing the measured received signal strength with a threshold.

38. The apparatus of claim 37, wherein, if the measured received signal strength is greater than or equal to the threshold, the identification of the downlink carrier frequency comprises identifying a downlink carrier frequency that is paired with the uplink carrier frequency.

39. The apparatus of claim 35, wherein the restriction of transmission comprises temporarily restricting beacon transmissions by the first access point on the identified downlink carrier frequency.

40. The apparatus of claim 35, wherein the restriction of transmission comprises reducing how frequently the first access point transmits beacon signals on the identified downlink carrier frequency.

41. The apparatus of claim 35, wherein the restriction of transmission comprises temporarily ceasing transmissions by the first access point on the identified downlink carrier frequency.

42. The apparatus of claim 35, wherein the restriction of transmission is invoked for a defined period of time.

43. The apparatus of claim 35, further comprising:
means for measuring received signal strength on the uplink carrier frequency associated with the downlink carrier frequency;
means for determining that the measured received signal strength is less than or equal to a threshold; and
means for terminating the restriction of transmission as a result of the determination that the measured received signal strength is less than or equal to the threshold.

44. A computer-program product, comprising:
a non-transitory computer-readable medium comprising code for causing a computer to:
detect, at a first access point, an access terminal located near the first access point, wherein the access terminal is communicating with a second access point, and wherein the first access point comprises a small coverage access point;

identify, at the first access point, a downlink carrier frequency associated with at least the second access point on which the access terminal is communicating with the second access point, wherein the second access point comprises a macro coverage access point and measurements on the downlink carrier frequency are utilized to identify a corresponding uplink carrier frequency; and restrict, at the first access point, transmission of first access point information on the identified downlink carrier frequency associated with at least the second access point as a result of the detection of the access terminal for reducing potential interference at the access terminal, wherein restricting the transmission comprises temporarily reducing transmit power used by the first access point on the identified downlink carrier frequency, and wherein a maximum transmit power value for the reduced transmit power is specified based on a measurement of received signal strength on an uplink carrier frequency.

45. The computer-program product of claim 44, wherein the detection of the access terminal comprises determining that the access terminal is being or has been handed-over from the first access point.

46. The computer-program product of claim 44, wherein the detection of the access terminal comprises:
    measuring received signal strength on the uplink carrier frequency; and
    comparing the measured received signal strength with a threshold.

47. The computer-program product of claim 46, wherein, if the measured received signal strength is greater than or equal to the threshold, the identification of the downlink carrier frequency comprises identifying a downlink carrier frequency that is paired with the uplink carrier frequency.

48. The computer-program product of claim 44, wherein the restriction of transmission comprises temporarily restricting beacon transmissions by the first access point on the identified downlink carrier frequency.

49. The computer-program product of claim 44, wherein the restriction of transmission comprises reducing how frequently the first access point transmits beacon signals on the identified downlink carrier frequency.

50. The computer-program product of claim 44, wherein the restriction of transmission comprises temporarily ceasing transmissions by the first access point on the identified downlink carrier frequency.

51. The computer-program product of claim 44, wherein the restriction of transmission is invoked for a defined period of time.

52. The computer-program product of claim 44, wherein the computer-readable medium further comprises code for causing the computer to:
    measure received signal strength on the uplink carrier frequency associated with the downlink carrier frequency;
    determine that the measured received signal strength is less than or equal to a threshold; and
    terminate the restriction of transmission as a result of the determination that the measured received signal strength is less than or equal to the threshold.

53. A method of communication, comprising:
    detecting an access terminal at a first access point, wherein the detection of the access terminal comprises:
    measuring received signal strength on an uplink carrier frequency; and
    comparing the measured received signal strength with a threshold, wherein the threshold is determined by:
        measuring received signal strength on the uplink carrier frequency over a period of time;
        calculating a nominal received signal strength based on the measurement of received signal strength over the period of time; and
        determining the threshold based on the nominal received signal strength;
    identifying a downlink carrier frequency on which the access terminal is actively receiving information from a second access point; and
    restricting transmission by the first access point on the identified downlink carrier frequency as a result of the detection of the access terminal.

* * * * *